(12) United States Patent
Lee et al.

(10) Patent No.: US 12,501,800 B2
(45) Date of Patent: Dec. 16, 2025

(54) DISPLAY DEVICE

(71) Applicant: Samsung Display Co., Ltd., Yongin-si (KR)

(72) Inventors: Dong Hyun Lee, Yongin-si (KR); Jae Hak Lee, Yongin-si (KR); Si Joon Song, Yongin-si (KR); Sang Hyuck Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 99 days.

(21) Appl. No.: 18/601,888

(22) Filed: Mar. 11, 2024

(65) Prior Publication Data

US 2025/0056983 A1  Feb. 13, 2025

(30) Foreign Application Priority Data

Aug. 10, 2023 (KR) .................. 10-2023-0105084

(51) Int. Cl.

| | |
|---|---|
| *H10K 59/131* | (2023.01) |
| *G06F 3/041* | (2006.01) |
| *G06F 3/044* | (2006.01) |
| *G09G 3/32* | (2016.01) |
| *H10K 59/40* | (2023.01) |

(52) U.S. Cl.
CPC ......... *H10K 59/131* (2023.02); *G06F 3/0412* (2013.01); *G06F 3/044* (2013.01); *G09G 3/32* (2013.01); *H10K 59/40* (2023.02); *G06F 2203/04111* (2013.01); *G09G 2300/0408* (2013.01)

(58) Field of Classification Search
CPC .. G09G 3/32; G09G 2300/0408; H10K 59/40; H10K 59/131; H10K 59/873; G06F 3/044; G06F 3/04164; G06F 3/0412; G06F 2203/04111
See application file for complete search history.

(56) References Cited

U.S. PATENT DOCUMENTS

| | | | |
|---|---|---|---|
| 11,061,505 B2* | 7/2021 | Jang ................ | G06F 3/0412 |
| 11,194,432 B2* | 12/2021 | Kim ................ | G06F 3/04164 |

(Continued)

FOREIGN PATENT DOCUMENTS

| | | |
|---|---|---|
| JP | 2017-161887 A | 9/2017 |
| KR | 2020-0001654 A | 1/2020 |
| KR | 2020-0077250 A | 6/2020 |

*Primary Examiner* — Doon Y Chow
(74) *Attorney, Agent, or Firm* — Womble Bond Dickinson (US) LLP

(57) ABSTRACT

A display device includes: a first substrate, a barrier film, and a second substrate; a thin-film transistor layer, an emission material layer, an encapsulation layer and a touch detecting unit stacked on the second substrate; and a pad area in a non-display area and comprising pads connected to a driving substrate and facing the first substrate, the pads comprising: a pad contact hole formed by etching the second substrate and the barrier film; a first inorganic film and a pad electrode stacked on an inner circumferential surface of the pad contact hole; and a rear contact hole etched through a portion of the first substrate, and a pad bonded to the rear contact hole, with a middle hole connecting the pad contact hole with the rear contact hole, and the pad of the driving substrate is electrically connected to the pad electrode through a lower conductive ink.

20 Claims, 37 Drawing Sheets

(56) References Cited

U.S. PATENT DOCUMENTS

| | | | |
|---|---|---|---|
| 11,444,144 B2* | 9/2022 | Kim | G02F 1/136286 |
| 2019/0109288 A1 | 4/2019 | Li et al. | |
| 2020/0194714 A1* | 6/2020 | Won | H10K 59/8731 |
| 2025/0107360 A1* | 3/2025 | Lee | H10K 59/131 |

* cited by examiner

DISPLAY DEVICE

CROSS-REFERENCED TO RELATED APPLICATION

The present application claims priority to and the benefit of from Korean Patent Application No. 10-2023-0105084, filed on Aug. 10, 2023, in the Korean Intellectual Property Office, the entire disclosure of which is incorporated herein by reference.

BACKGROUND

1. Field

Aspects of some embodiments of the present disclosure relate to a display device.

2. Description of the Related Art

As the information-oriented society evolves, consumer demand for display devices is ever increasing. A display devices may be a flat panel display device such as a liquid-crystal display device, a field emission display device, and a light-emitting display device. Light-emitting display devices may include an organic light-emitting display device including organic light-emitting emitting diodes as light-emitting elements, or an light-emitting diode display device including inorganic light-emitting diodes such as light-emitting diodes (LEDs) as light-emitting elements.

A display panel of a display device includes a display area where pixels for displaying images are arranged, and a non-display area (or bezel area) located around the display area (e.g., in a periphery or outside a footprint of the display area). Lines for driving pixels may be located in the non-display area. The non-display area of the display panel does not display images. As the size or footprint of the non-display area is reduced, the display area can be relatively expanded.

The above information disclosed in this Background section is only for enhancement of understanding of the background and therefore the information discussed in this Background section does not necessarily constitute prior art.

SUMMARY

Aspects of some embodiments of the present disclosure include a display device that can relatively increase a display area by reducing a non-display area.

According to some embodiments of the present disclosure, a display device may include a substrate comprising a first substrate, a barrier film and a second substrate sequentially stacked on one another, a thin-film transistor layer, an emission material layer, an encapsulation layer and a touch detecting unit sequentially stacked on the second substrate, and a pad area located in a non-display area of the substrate and comprising a plurality of pads connected to a driving substrate facing the first substrate. According to some embodiments, each of the plurality of pads may include a pad contact hole formed by etching the second substrate and the barrier film, a first inorganic film and a pad electrode sequentially stacked on an inner circumferential surface of the pad contact hole, and a rear contact hole formed by etching a portion of the first substrate in line with the pad contact hole, a pad of the driving substrate being bonded to a bottom of the rear contact hole. According to some embodiments, the first inorganic film forms a middle hole connecting the pad contact hole with the rear contact hole, and the pad electrode covers at least a part of the middle hole, and the pad of the driving substrate is electrically connected to the pad electrode covering the middle hole through a lower conductive ink.

According to some embodiments, the driving substrate may include a pad bonded to the bottom of the rear contact hole, a pad hole penetrating a portion of the pad aligned with the middle hole in a thickness direction, the lower conductive ink covering the inner circumferential surface of the pad hole, and a protective resin covering the lower conductive ink.

According to some embodiments, the driving substrate may include a flexible printed circuit board (FPCB) and a driver chip on the FPCB as a chip on film (COF).

According to some embodiments, the driving substrate may include a flexible substrate and a driver chip on the flexible substrate as a chip on plastic (COP).

According to some embodiments, the first inorganic film is in a same layer as an inorganic film included in the thin-film transistor layer.

According to some embodiments, the pad electrode is in a same layer as a source electrode or a drain electrode of a thin-film transistor in the thin-film transistor layer.

According to some embodiments, the pad electrode is one of a signal pad extended from signal lines for driving pixels in a display area, a power pad extended from power lines, an electrostatic pad electrically connected to electrostatic lines, and a touch driving pad electrically connected to a touch line of the touch detecting unit.

According to some embodiments, the display device may include a second inorganic film covering the pad electrode on the inner circumferential surface of the pad contact hole. According to some embodiments, the second inorganic film is on a same layer as an inorganic film in the encapsulation layer.

According to some embodiments, the display device may include a planarization film covering the pad electrode on the inner circumferential surface of the pad contact hole. According to some embodiments, the planarization film is on a same layer as at least one of a planarization film between the thin-film transistor layer and the emission material layer, or a pixel-defining layer in the emission material layer.

According to some embodiments, the display device may include an upper conductive ink covering the pad electrode on the inner circumferential surface of the pad contact hole, and a protective resin covering the upper conductive ink, the upper conductive ink and the lower conductive ink are connected with each other through the middle hole.

According to some embodiments of the present disclosure, a display device may include a substrate comprising a first substrate, a barrier film and a second substrate sequentially stacked on one another, a thin-film transistor layer, an emission material layer, an encapsulation layer and a touch detecting unit sequentially stacked on the second substrate, and a pad area located in a non-display area of the substrate and comprising a plurality of pads connected to a driving substrate and facing the first substrate. According to some embodiments, each of the plurality of pads may include a pad contact hole formed by etching the second substrate and the barrier film, a first inorganic film and a pad electrode sequentially stacked on an inner circumferential surface of the pad contact hole, and a rear contact hole formed by etching a portion of the first substrate in line with the pad contact hole, a pad of the driving substrate being bonded to a bottom of the rear contact hole. According to some embodiments, the first inorganic film forms a middle hole connecting the pad contact hole with the rear contact hole, and the pad of the driving substrate is electrically connected to the pad electrode through the middle hole and an upper conductive ink covering the pad electrode.

According to some embodiments, the driving substrate may include a flexible printed circuit board (FPCB) and a driver chip on the FPCB as chip on film (COF).

According to some embodiments, the driving substrate may include a flexible substrate and a driver chip on the flexible substrate as chip on plastic (COP).

According to some embodiments, the first inorganic film is in a same layer as an inorganic film included in the thin-film transistor layer.

According to some embodiments, the pad electrode is in a same layer as a source electrode or a drain electrode of a thin-film transistor in the thin-film transistor layer.

According to some embodiments, the pad electrode is one of a signal pad extended from signal lines for driving pixels in a display area, a power pad extended from power lines, an electrostatic pad electrically connected to electrostatic lines, and a touch driving pad electrically connected to a touch line of the touch detecting unit.

According to some embodiments, the pad of the driving substrate may include a groove aligned with the middle hole.

According to some embodiments, the groove of the pad is filled with a part of the upper conductive ink.

According to some embodiments, the driving substrate may include a substrate, a pad on the substrate and bonded to a bottom of the rear contact hole, a pad hole penetrating portions of the pad and the substrate in line with the middle hole in a thickness direction, the lower conductive ink covering an inner circumferential surface of the pad hole, and a protective resin covering the lower conductive ink. According to some embodiments, the lower conductive ink is connected to the upper conductive ink through the pad hole and the middle hole.

According to some embodiments, the driving substrate may include a substrate bonded to a bottom of the rear contact hole, a pad under the substrate, a pad hole penetrating portions of the pad and the substrate in line with the middle hole in a thickness direction, the lower conductive ink covering an inner circumferential surface of the pad hole, and a protective resin covering the lower conductive ink. According to some embodiments, the lower conductive ink is connected to the upper conductive ink through the pad hole and the middle hole.

According to some embodiments, a display area can be relatively expanded by reducing a non-display area.

However, aspects of embodiments according to the present disclosure are not restricted to those set forth herein. The above and other aspects of embodiments according to the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of embodiments according to the present disclosure will become more apparent by describing in more detail aspects of some embodiments thereof with reference to the attached drawings, in which.

DETAILED DESCRIPTION

Aspects of some embodiments of the present disclosure will now be described more fully hereinafter with reference to the accompanying drawings, in which aspects of some embodiments of the invention are shown. This invention may, however, be embodied in different forms and should not be construed as limited to the embodiments set forth herein. Rather, these embodiments are provided so that this disclosure will be more thorough and complete, and will more fully convey the scope of embodiments according to the present disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, aspects of some embodiments will be described in more detail with reference to the accompanying drawings.

Figure 1:
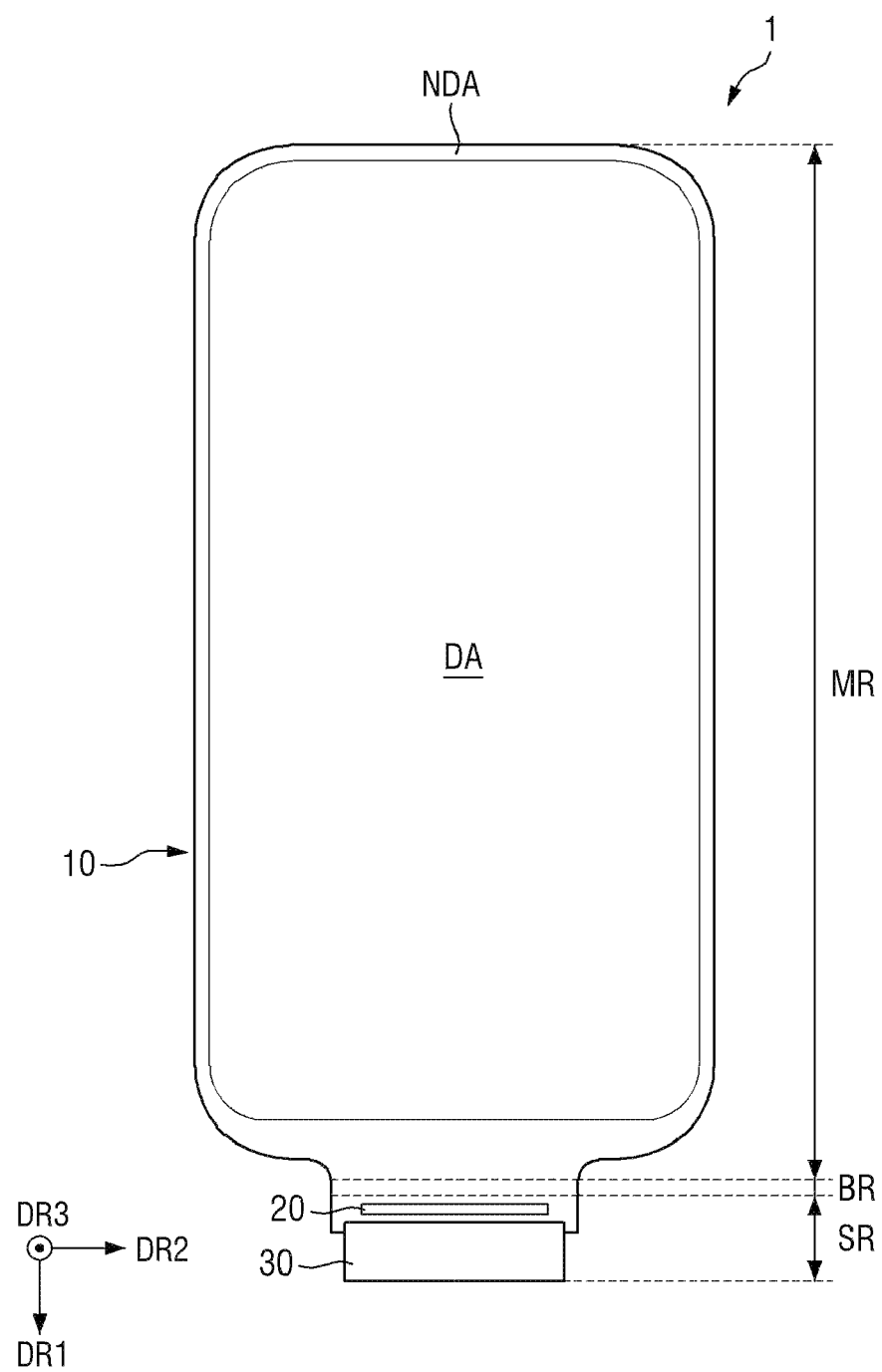
FIG. 1 is a plan view of a display device according to Comparative Example.
Figure 2:
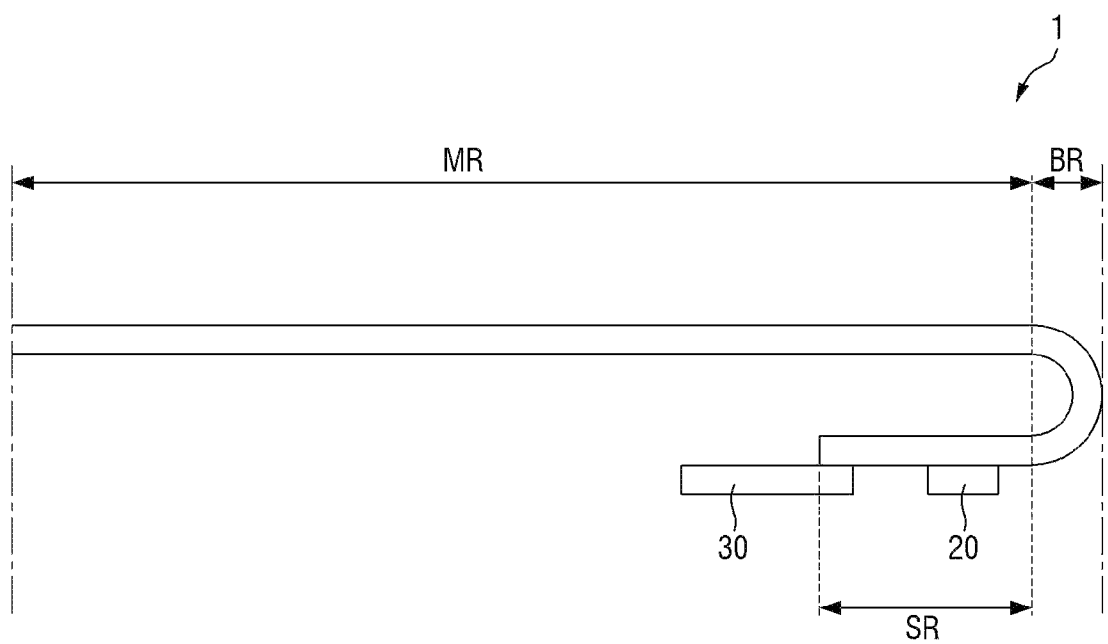
FIG. 2 is a cross-sectional view of the display device according to Comparative Example.

FIG. 1 is a plan view of a display device according to Comparative Example. FIG. 2 is a cross-sectional view of the display device according to Comparative Example.

In the plan view of FIG. 1, the upper, lower, left, and right sides are defined for convenience of illustration. The up-and-down directions refer to vertical or column directions and are defined as first directions DR1. The left-and-right directions refer to horizontal or row directions and are defined as second directions DR2. A vertical direction is defined as a third direction DR3.

Referring to FIGS. 1 and 2, a display device 1 according to Comparative Example may include a display panel 10. The display panel 10 may include a substrate SUB including a flexible polymer material such as polyimide. Accordingly, the display panel 10 may be curved, bent, folded, or rolled.

The display panel 10 may include a main region MR, a bending region BR extended from one side of the main region MR, and a subsidiary region SR extended from one side of the bending region BR. The bending region BR may be located between the main region MR and the subsidiary area SR, and may be bent with a curvature (e.g., a set or predetermined curvature). The subsidiary region SR may overlap with the main region MR in the thickness direction (e.g., third direction DR3) as the bending region BR is bent.

In the display panel 10, a display area DA where images are displayed may be located within the main region MR. In the display panel 10, a non-display area NDA where no image is displayed may be the remaining area excluding the display area DA. The main region MR may have a shape generally similar to the appearance of the display device 1 when viewed from the top. The main region MR may be a flat region located in one plane.

The display area DA of the display panel 10 may be located at the center of the main region MR. The display area DA may include a plurality of pixels. The display area DA may have a rectangular shape or a rectangular shape with rounded corners.

In the main region MR, the non-display area NDA may be located around the display area DA. In the main region MR, the non-display area NDA may be extended from the outer border of the display area DA to the edge of the display panel 10. In the non-display area NDA of the main region MR, signal lines for applying signals to the display area DA or driving circuits may be arranged.

The bending region BR may be connected to an end of the main region MR. The width of the bending region BR may be less than the width (width of the shorter side) of the main region MR. In the bending region BR, the display panel 10 may be bent downward in the thickness direction, i.e., in the direction away from the display surface with a curvature.

The subsidiary region SR may be extended in a direction parallel to the main region MR from an end of the bending region. The subsidiary region SR may overlap with the main region MR in the thickness direction of the display panel 10. The subsidiary region SR may overlap with the non-display area NDA at the edge of the main region MR and may also overlap with the display area DA of the main region MR.

A driver chip 20 may be located on the subsidiary region SR of the display panel 10. The driver chip 20 may include an integrated circuit for driving the display panel 10. The driver chip 20 may be mounted on the display panel 10 in the subsidiary region SR.

The driver chip 20 may be attached on the display panel 10 by an anisotropic conductive film or on the display panel 10 by ultrasonic bonding.

A pad area may be located at the end of the subsidiary region SR of the display panel 10. The display panel 10 may be connected to a display driving substrate 30 through the pad area. The display driving substrate 30 may be a flexible printed circuit board or a film.

A plurality of signal lines SL may be located in the subsidiary region SR, the bending region BR and the main region MR. The signal lines may be extended from the main region MR to the pad area of the subsidiary region SR via the bending region BR.

As described above, in the display device 1 according to Comparative Example shown in FIGS. 1 and 2, as the bending region BR of the display panel 10 is bent, the subsidiary region SR where the pad area and the driver chip 20 is located is placed so that it faces downward in the thickness direction. In order to reduce the width of the non-display area NDA (i.e., the bezel width, or the width of the dead space) of the display device 1 according to Comparative Example excluding the display area DA, it is required to increase the curvature of the bending region BR. However, as the curvature of the bending region BR increases, it is more likely that defects occur on the lines. For this reason, there is a limit in increasing the curvature of the bending region BR in order to reduce the width of the non-display area NDA (i.e., the bezel width, or the width of the dead space).

In view of the above, according to some embodiments of the present disclosure, a display panel 10 does not include a bending region that is bent, and a pad area 430 is connected to a driver circuit such as the driving substrate 410 through the rear side of the display panel 10, so that the width of the non-display area NDA (i.e., the bezel width or the width of the dead space) can be reduced compared to Comparative Example shown in FIGS. 1 and 2. Hereinafter, a display device 1 according to some embodiments of the present disclosure will be described in detail with reference to FIGS. 3 to 37.

Figure 3:
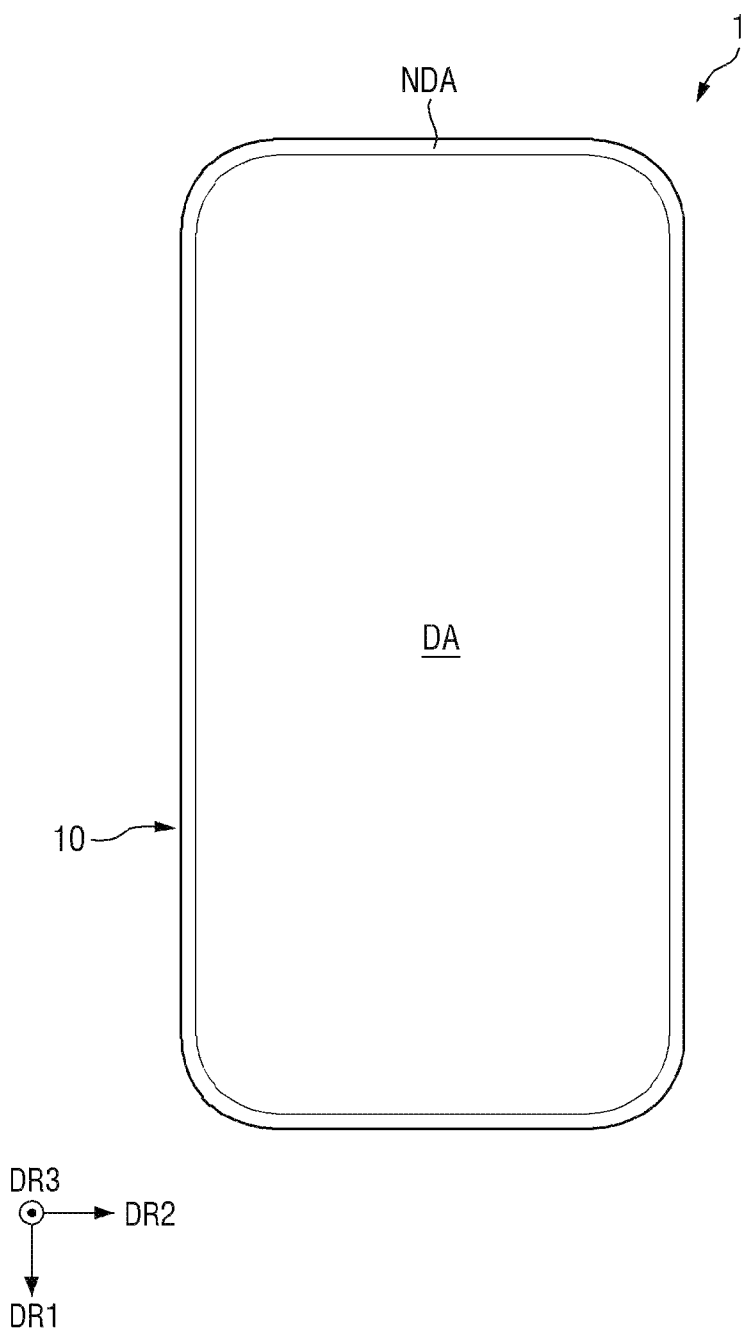
FIG. 3 is a plan view of a display device according to some embodiments of the present disclosure.
Figure 4:
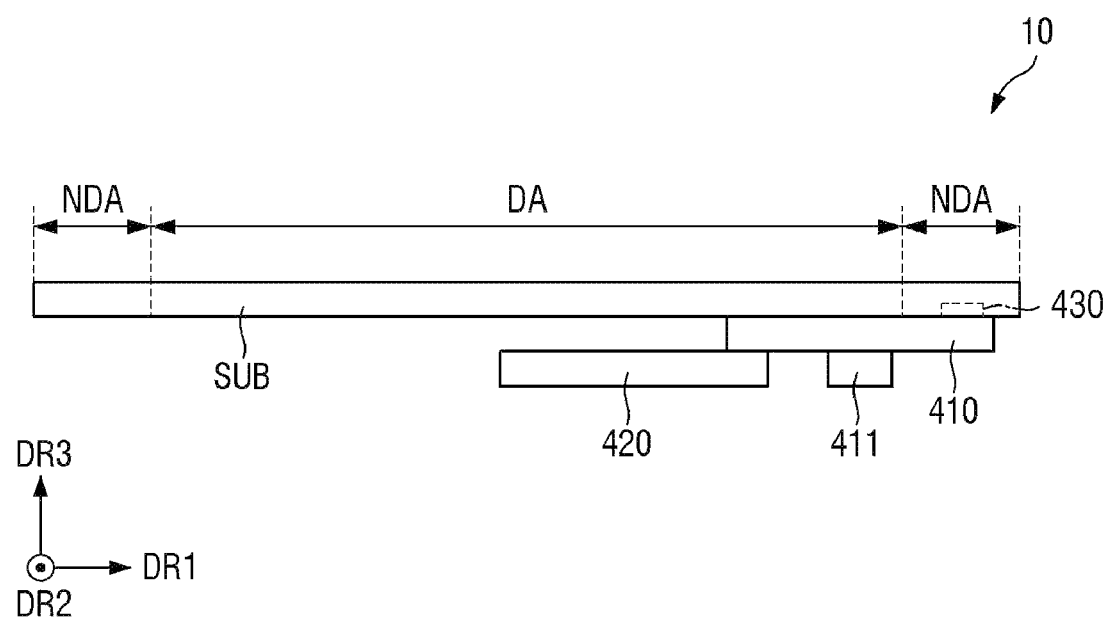
FIG. 4 is a cross-sectional view of a display device according to some embodiments of the present disclosure.

FIG. 3 is a plan view of a display device 1 according to some embodiments of the present disclosure. FIG. 4 is a cross-sectional view of the display device 1 according to some embodiments of the present disclosure.

Referring to FIGS. 3 and 4, the display device 1 may display a moving image or a still image. The display device 1 may be applied to portable electronic devices such as a mobile phone, a smart phone, a tablet PC, a smart watch, a watch phone, a mobile communications terminal, an electronic notebook, an electronic book, a portable multimedia player (PMP), a navigation device and a ultra mobile PC (UMPC), as well as a variety of products such as a television, a notebook, a monitor, a billboard and the Internet of Things. Examples of the display device 1 may include an organic light-emitting display device, a liquid-crystal display device, a plasma display device, a field emission display device, an electrophoretic display device, an electrowetting display device, a quantum dot light-emitting display device, a micro LED display device, etc. In the following description, an organic light-emitting display device will be described as an example of the display device 1. It is, however, to be understood that embodiments according to the present disclosure are not limited thereto.

The display device 1 may include a display panel 10. The display panel 10 may include a substrate SUB including a flexible polymer material such as polyimide. Accordingly, the display panel 10 may be curved, bent, folded, or rolled.

The display panel 10 includes the display area DA and the non-display area NDA. The non-display area NDA may refer to the other area than the display area DA. The pad area 430 exposed on the rear side of the display panel 10 is located in the non-display area NDA. The pad area 430 is exposed through a portion of the rear surface of the display panel 10 in the non-display area NDA. The pad area 430 may be connected to the driving substrate 410 arranged to face the rear surface of the display panel 10. The pad area 430 of the display panel 10 may include a pad electrode 922. The pad electrode 922 may be electrically connected to a pad (e.g., a bump) of the driving substrate 410 by a conductive member such as a conductive ink 1211 (e.g., a metal ink).

In the non-display area NDA, signal lines for applying signals to the display area DPA or driver circuits may be arranged. The signal lines may be extended from the display area DA to the pad area 430 via the non-display area NDA.

A driver chip 411 may be located on the driving substrate 410. The driver chip 411 may include an integrated circuit for driving the display panel 10. The driver chip 411 may be an integrated circuit in the form of COP (Chip on Plastic). In this instance, the driving substrate 410 may include a plastic substrate (or flexible substrate) containing a flexible polymer material such as polyimide. The driver chip 411 may be an integrated circuit in the form of COF (Chip on Film). In this instance, the driving substrate 410 may be a substrate in the form of a film such as a flexible printed circuit board (FPCB). That is to say, the driving substrate 410 of the display device 1 according to some embodiments described herein may be a plastic substrate (or flexible substrate) containing a flexible polymer material such as polyimide, or a film-type substrate such as a flexible printed circuit (FPCB).

A lead line pad area connected to a main board 420 may be located at an end of the driving substrate 410. The driving substrate 410 may be connected to the main board 420 through the lead line pad area 430 located at an end thereof. A processor (i.e., a host or a controller) that controls the overall operation of the display device 1, a memory, a touch driver circuit, a power circuit may be located on the main board 420.

As such, in the display device 1 according to some embodiments, the display panel 10 does not include a bending area and is connected to a driver circuit such as the driving substrate 410 through the rear surface. The display device 1 can reduce the width of the non-display area NDA (i.e., the bezel width or the width of the dead space) compared to Comparative Example shown in FIGS. 1 and 2.

Figure 5:
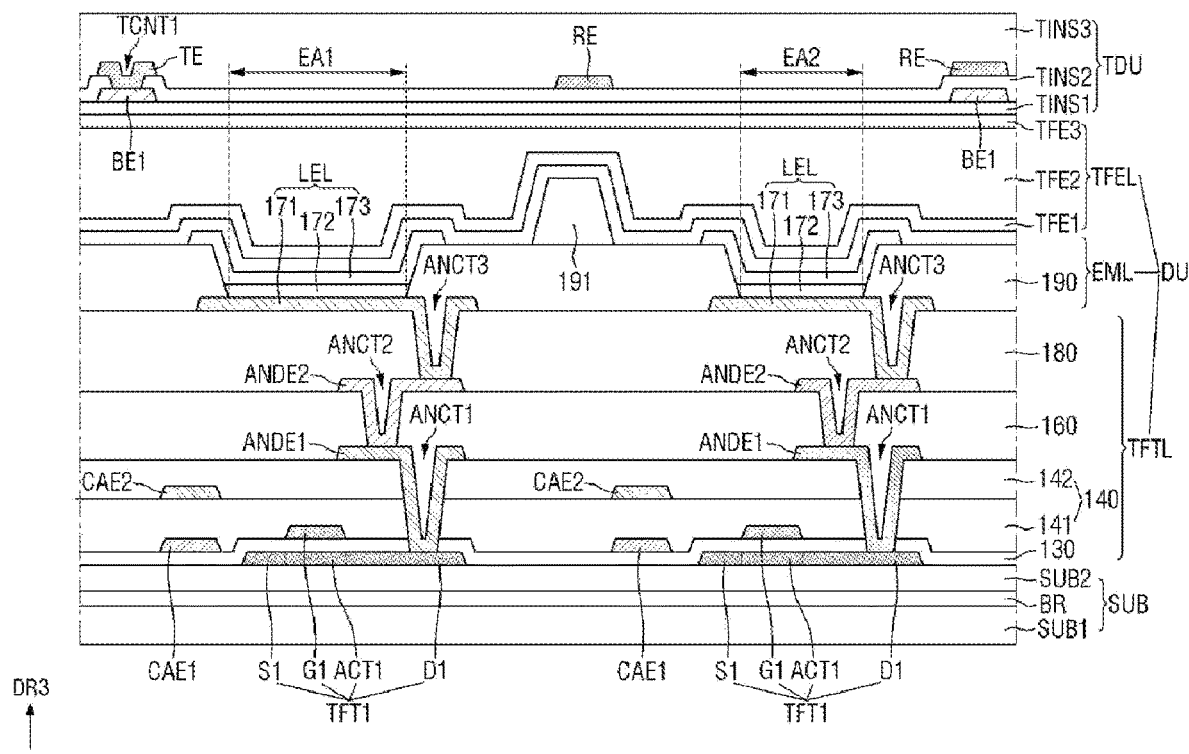
FIG. 5 is a cross-sectional view showing a structure of a portion of a display area of a display panel according to some embodiments.

FIG. 5 is a cross-sectional view showing a structure of a portion of the display area DA of the display panel 10 according to some embodiments.

In the description with reference to FIG. 5, an element located "on" the display panel 10 may mean that the element is located on the front side of the display panel 10 in the third direction DR3. The front side of the display panel 10 may refer to the side on which light-emitting elements included in the display panel 10 emit light for displaying images.

Referring to FIG. 5, the display panel 10 uses a flexible plastic substrate as a base substrate. The substrate SUB may be made of an insulating material such as a polymer resin. For example, the substrate SUB may be made of polyimide. Accordingly, the substrate SUB may be bent, folded, or rolled. The substrate SUB may include a multi-layer including a first substrate SUB1, a second substrate SUB2 and a barrier film BR located therebetween. For example, the substrate SUB of the display panel 10 includes a first substrate SUB1, a barrier film BR located on the first substrate SUB1, and a second substrate SUB1 located on the barrier film BR. The first substrate SUB1 and the second substrate SUB2 may include a flexible material such as polyimide.

The barrier film BR is a film for protecting the thin-film transistors of the thin-film transistor layer TFTL and an emissive layer 172 of the emission material layer EML from outside moisture. The barrier film BR may be made up of multiple inorganic films 911 stacked on one another alternately. For example, the barrier film BR may be made up of multiple layers in which one or more inorganic layers 911 of a silicon nitride layer, a silicon oxynitride layer, a silicon oxide layer, a titanium oxide layer and an aluminum oxide layer are alternately stacked on one another.

A thin-film transistor layer TFTL including thin-film transistors, an emission material layer EML including light-emitting elements LEL, an encapsulation layer TFEL that encapsulates the light-emitting elements LEL, and a touch detecting unit TDU may be sequentially stacked on the second substrate SUB2. According to some embodiments, at least some of the layers shown in FIG. 5 may not be located in the non-display area NDA of the display panel 10. Because the thin-film transistor layer TFTL, the emission material layer EML and the encapsulation layer TFEL are responsible for displaying images, they may be referred to as a display unit DU, but the name is not limited thereto.

Thin-film transistors of a pixel driver circuit for driving each pixel are located on the second substrate SUB2. FIG. 5 shows a first thin-film transistor TFT1 among thin-film transistors of a pixel driver circuit. For example, the first thin-film transistor TFT1 may work as a driving transistor in the pixel driver circuit.

The first thin-film transistor TFT1 may include a first active layer ACT1 and a first gate electrode G1. The first active layer ACT1 may include polycrystalline silicon, single crystal silicon, low-temperature polycrystalline silicon, amorphous silicon or an oxide semiconductor.

The first active layer ACT1 may include a first source region S1 and a first drain region D1. The first channel region CHA1 may overlap with the first gate electrode G1 in the third direction DR3 that is the thickness direction of the substrate SUB. The first source region S1 may be located on one side of the first active layer ACT1, and the first drain region D1 may be located on the opposite side of the first active layer ACT1. The first source region S1 and the first drain region D1 may not overlap with the first gate electrode G1 in the third direction DR3. The first source region S1 and the first drain region D1 may have conductivity by doping a silicon semiconductor or an oxide semiconductor with ions or impurities.

A gate insulator 130 may be located on the first active layer ACT1 of the first thin-film transistor TFT1. The gate insulator 130 may be formed of an inorganic layer, for example, a silicon nitride layer, a silicon oxynitride layer, a silicon oxide layer, a titanium oxide layer, or an aluminum oxide layer.

The first gate electrode G1 of the first thin-film transistor TFT1 and a first capacitor electrode CAE1 may be located on the gate insulator 130. The first gate electrode G1 may overlap the first active layer ACT1 in the third direction DR3. Although the first gate electrode G1 and the first capacitor electrode CAE1 are spaced apart from each other in the example shown in FIG. 5, the first gate electrode G1 and the first capacitor electrode CAE1 may be connected with each other. The first gate electrode G1 and the capacitor electrode CAE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

Interlayer dielectric films 140 may be located on the first gate electrode G1 of the first thin-film transistor TFT1 and the first capacitor electrode CAE1. For example, a first interlayer dielectric film 141 may be located on the first gate electrode G1 of the first thin-film transistor TFT1 and the first capacitor electrode CAE1. The first interlayer dielectric film 141 may be formed of an inorganic layer, for example, a silicon nitride layer, a silicon oxynitride layer, a silicon oxide layer, a titanium oxide layer, or an aluminum oxide layer. The first interlayer dielectric film 141 may be made of a plurality of inorganic films.

The second capacitor electrode CAE2 may be located on the first interlayer dielectric layer 141. The second capacitor electrode CAE2 may overlap the first capacitor electrode CAE1 of the first thin-film transistor TFT1 in the third direction DR3. When the first capacitor electrode CAE1 is connected to the first gate electrode G1, the second capacitor electrode CAE2 may overlap the first gate electrode G1 in the third direction DR3. Because the first interlayer dielectric layer 141 has a dielectric constant (e.g., a set or predetermined dielectric constant), a capacitor can be formed by the first capacitor electrode CAE1, the second capacitor electrode CAE2 and the first interlayer dielectric layer 141 located therebetween. The second capacitor electrode CAE2 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be located over the second capacitor electrode CAE2. The second interlayer dielectric film 142 may be formed of an inorganic layer, for example, a silicon nitride layer, a silicon oxynitride layer, a silicon oxide layer, a titanium oxide layer, or an aluminum oxide layer. The second interlayer dielectric film 142 may be made of a plurality of inorganic films.

A first anode connection electrode ANDE1 may be located on the second interlayer dielectric layer 142. The first anode connection electrode ANDE1 may be connected to the first drain electrode D1 of the first thin-film transistor TFT1 through a first connection contact hole ANCT1 that penetrates the gate insulator 130, the first interlayer dielectric film 141 and the second interlayer dielectric film 142. The first anode connection electrode ANDE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first planarization film 160 may be located over the first anode connection electrode ANDE1 for providing a flat surface over level differences due to the first thin-film transistor TFT1. The first planarization film 160 may be formed of an organic layer such as an acryl resin, an epoxy resin, a phenolic resin, a polyamide resin and a polyimide resin.

A second anode connection electrode ANDE2 may be located on the first planarization film 160. The second anode connection electrode ANDE2 may be connected to the first anode connection electrode ANDE1 through a second connection contact hole ANCT2 penetrating the first planarization film 160. The second anode connection electrode ANDE2 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second planarization film 180 may be located on the second anode connection electrode ANDE2. The second planarization film 180 may be formed as an organic layer such as an acryl resin, an epoxy resin, a phenolic resin, a polyamide resin and a polyimide resin.

Light-emitting elements LEL and a bank 190 may be located on the second planarization film 180. Each of the light-emitting elements LEL includes a pixel electrode 171, an emissive layer 172, and a common electrode 173.

The pixel electrode 171 may be located on the second planarization film 180. The pixel electrode 171 may be connected to the second anode connection electrode ANDE2 through a third connection contact hole ANCT3 penetrating the second planarization film 180.

In the top-emission structure in which light exits from the emissive layer 172 toward the common electrode 173, the pixel electrode 171 may be made of a metal material having a high reflectivity such as a stack structure of aluminum and titanium (Ti/Al/Ti), a stack structure of aluminum and indium tin oxide (ITO) (ITO/Al/ITO), an APC alloy and a stack structure of APC alloy and ITO (ITO/APC/ITO). The APC alloy is an alloy of silver (Ag), palladium (Pd) and copper (Cu).

The bank 190 may partition the pixel electrode 171 on the second planarization film 180 to define a light-emitting area of each pixel, e.g., an emission area. In the emission areas EA1 and EA2, the pixel electrode 171, the emissive layer 172 and the common electrode 173 are stacked on one another sequentially, so that holes from the pixel electrode 171 and electrons from the common electrode 173 are recombined with each other in the emissive layer 172 to emit light.

In the example shown in FIG. 5, the bank 190 defines a first emission area EA1 of a first pixel and a second emission area EA2 of a second pixel, which are adjacent to each other. The bank 190 may be arranged to cover the edges of the pixel electrode 171. The bank 190 may be formed of an organic layer such as an acryl resin, an epoxy resin, a phenolic resin, a polyamide resin and a polyimide resin. The bank 190 may also be referred to as a pixel definition layer PDL. According to some embodiments, the display panel 10 includes a plurality of pixels including a first pixel, a second pixel, and a third pixel. For example, the first pixel may include the first emission area that emits a first color, the second pixel may include a second emission area that emits a second color, and the third pixel may include a third emission area that emits a third color. According to some embodiments, a plurality of pixels may further include a fourth pixel, and the fourth pixel may include a fourth emission area that emits a fourth color.

The emissive layer 172 may be located on the pixel electrode 171 and the bank 190. The emissive layer 172 may include an organic material to emit light of a certain color. For example, the emissive layer 172 may include a hole transporting layer, an organic material layer, and an electron transporting layer.

The common electrode 173 may be located on the emissive layer 172. The common electrode 173 may be arranged to cover the emissive layer 172. The common electrode 173 may be a common layer arranged commonly across the first emission area EA1, the second emission area EA2, and the third emission area. A capping layer may be formed on the common electrode 173.

In the top-emission organic light-emitting diode, the common electrode 173 may be formed of a transparent conductive material (TCP) such as ITO and IZO that can transmit light, or a semi-transmissive conductive material such as magnesium (Mg), silver (Ag) and an alloy of magnesium (Mg) and silver (Ag). When the common electrode 173 is formed of a semi-transmissive metal material, the light extraction efficiency can be increased by using microcavities.

A spacer 191 may be located on the bank 190. The spacer 191 may support a mask during a process of fabricating the emissive layer 172. The spacer 191 may be formed of an organic layer such as an acryl resin, an epoxy resin, a phenolic resin, a polyamide resin and a polyimide resin.

An encapsulation layer TFEL may be located on the common electrode 173. The encapsulation layer TFEL includes at least one inorganic film to prevent permeation of oxygen or moisture into the emission material layer EML. In addition, the encapsulation layer TFEL includes at least one organic layer to protect the light-emitting element layer EML from foreign substances such as dust. For example, the encapsulation layer TFEL includes a first inorganic encapsulation film TFE1, an organic encapsulation film TFE2 and a second inorganic encapsulation layer TFE3.

The first inorganic encapsulation film TFE1 may be located on the common electrode 173, the organic encapsulation film TFE2 may be located on the first inorganic encapsulation film TFE1, and the second inorganic encapsulation film TFE3 may be located on the organic encapsulation film TFE2. The first inorganic encapsulation film TFE1 and the second inorganic encapsulation film TFE3 may be made up of multiple layers in which one or more inorganic layers of a silicon nitride layer, a silicon oxynitride layer, a silicon oxide layer, a titanium oxide layer and an aluminum oxide layer are alternately stacked on one another. The organic encapsulation film TFE2 may be an organic film such as an acryl resin, an epoxy resin, a phenolic resin, a polyamide resin, a polyimide resin, etc.

The touch detecting unit TDU may be located on the encapsulation layer TFEL. The touch detecting unit TDU may be either a mutual-capacitance touch sensor or a self-capacitance touch sensor. Although a mutual-capacitance touch sensor is shown in FIG. 5, the present disclosure is not limited thereto. The touch detecting unit TDU includes a first touch insulating film TINS1, bridge electrodes BE1, a second touch insulating film TINS2, the driving electrodes TE, the sensing electrodes RE, and a third touch insulating film TINS3.

The first touch insulating film TINS1 may be formed of an inorganic layer, for example, a silicon nitride layer, a silicon oxynitride layer, a silicon oxide layer, a titanium oxide layer, or an aluminum oxide layer.

The bridge electrodes BE1 may be located on the first touch insulating film TINS1. The bridge electrode BE1 may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The second touch insulating film TINS2 is arranged over the bridge electrodes BE1. The second touch insulating layer TINS2 may be formed of an inorganic layer, for example, a silicon nitride layer, a silicon oxynitride layer, a silicon oxide layer, a titanium oxide layer, or an aluminum oxide layer. Alternatively, the second touch insulating layer TINS2 may be formed of an organic layer such as an acryl resin, an epoxy resin, a phenolic resin, a polyamide resin and a polyimide resin.

The driving electrodes TE and the sensing electrodes RE may be located on the second touch insulating film TINS2. The driving electrodes TE and the sensing electrodes RE may be made up of a single layer or multiple layers of one of molybdenum (Mo), aluminum (Al), chromium (Cr), gold (Au), titanium (Ti), nickel (Ni), neodymium (Nd) and copper (Cu) or an alloy thereof.

The driving electrodes TE and the sensing electrodes RE may overlap with the bridge electrodes BE1 in the third direction DR3. The driving electrodes TE may be connected to the bridge electrodes BE1 through touch contact holes TCNT1 penetrating through the first touch insulating film TINS1.

The third touch insulating film TINS3 is formed over the driving electrodes TE and the sensing electrodes RE. The third touch insulating layer TINS3 may provide a flat surface over level differences formed by the driving electrodes TE, the sensing electrodes RE and the bridge electrodes BE1. The third touch insulating film TINS3 may be formed of an organic layer such as an acryl resin, an epoxy resin, a phenolic resin, a polyamide resin and a polyimide resin.

Figure 6:
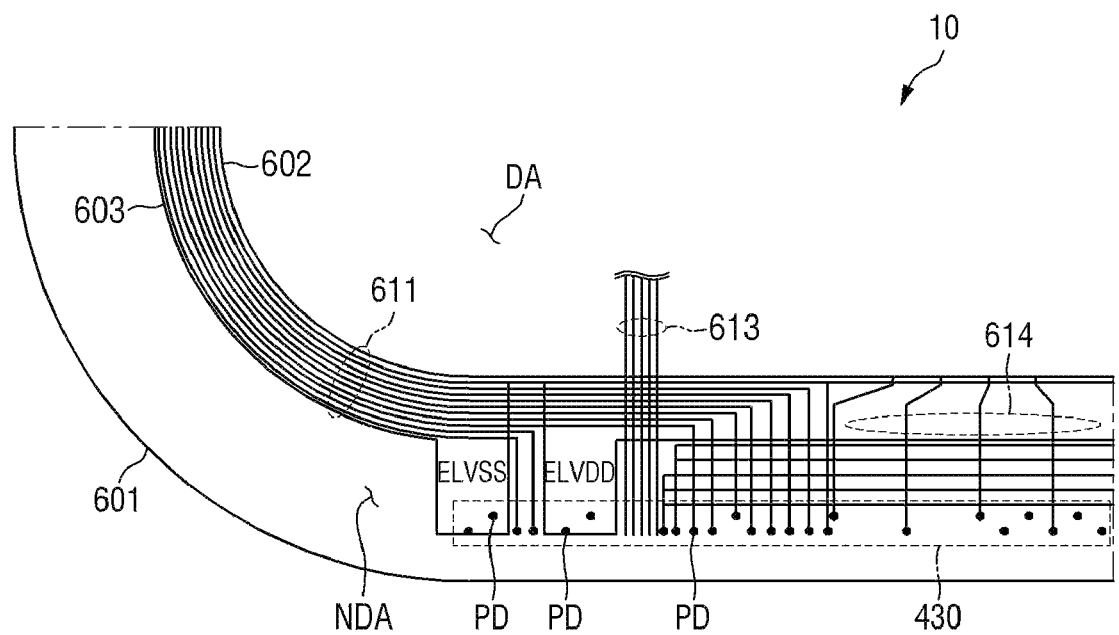
FIG. 6 is a plan view showing a portion of a non-display area of the display panel according to some embodiments.

FIG. 6 is a plan view showing a part of the non-display area NDA of the display panel 10 according to some embodiments. For example, FIG. 6 may show an example of the non-display area NDA around the pad area 430.

Referring to FIG. 6, in the non-display area NDA of the display panel 10 according to some embodiments, signal lines 611 and power lines 612 for driving pixels in the display area DA may be arranged. In addition, touch connection lines 613 for driving the touch detecting units TDU may be located in the non-display area NDA. The touch connection lines 613 may be connected to touch electrodes (e.g., electrodes TE and RE in FIG. 5) of the display area DA. The signal lines 611, the power lines 612 and the touch connection lines 613 may be extended to the pad area 430. The pad area 430 may be connected to a driver circuit such as the driving substrate 410 through the rear surface of the display panel 10.

According to some embodiments, electrostatic lines 614 for preventing static electricity may be further located in the non-display area NDA, and the electrostatic lines 614 may be extended to the pad area 430.

Herein, the pad area 430 of the display panel 10 includes a plurality of pads PD connected to the driving substrate 410 through the rear side of the display panel 10. The pads PD may include signal pads electrically connected to the signal lines 611, power pads electrically connected to the power lines, electrostatic pads electrically connected to the electrostatic lines 614, and touch driving pads electrically connected to the touch connection lines 613.

According to some embodiments, the signal lines 611 may include gate fan-out lines connected to gate lines of the display area DA, data fan-out lines connected to data lines of the display area DA, or emission fan-out lines connected to emission signal lines of the display area DA. These signal lines 611 may be located in the same layer as the first anode connection electrode ANDE1 or the second anode connection electrode ANDE2 of the display area DA.

According to some embodiments, the power lines 612 may include a high-level voltage ELVDD supply line and a low-level voltage ELVSS supply line as lines that supply driving power to the pixels of the display area DA. Such power lines 612 may be located in the same layer as the first anode connection electrode ANDE1 or the second anode connection electrode ANDE2 of the display area DA.

In FIG. 6, a solid line 601 indicates a border at a corner of the display panel 10. In FIG. 6, a solid line 602 is an imaginary line indicating the boundary between the non-display area NDA and the display area DA of the display panel 10. In FIG. 6, a solid line 603 indicates the border of the inorganic films TFE1 and TFE3 (see FIG. 5) of the encapsulation layer TFEL of the display panel 10. As shown in the drawing, the signal lines 611 and the power lines 612 for driving the pixels of the display area DA may be extended to the pad area 430 along the non-display area NDA on the inner side of the border of the inorganic films TFE1 and TFE3 (see FIG. 5) of the encapsulation layer TFEL. That is to say, the signal lines 611 and the power lines 612 for driving the pixels of the display area DA are not located outside the inorganic encapsulation area where the inorganic films TFE1 and TFE3 (see FIG. 5) of the encapsulation layer TFEL are located.

Figure 7:
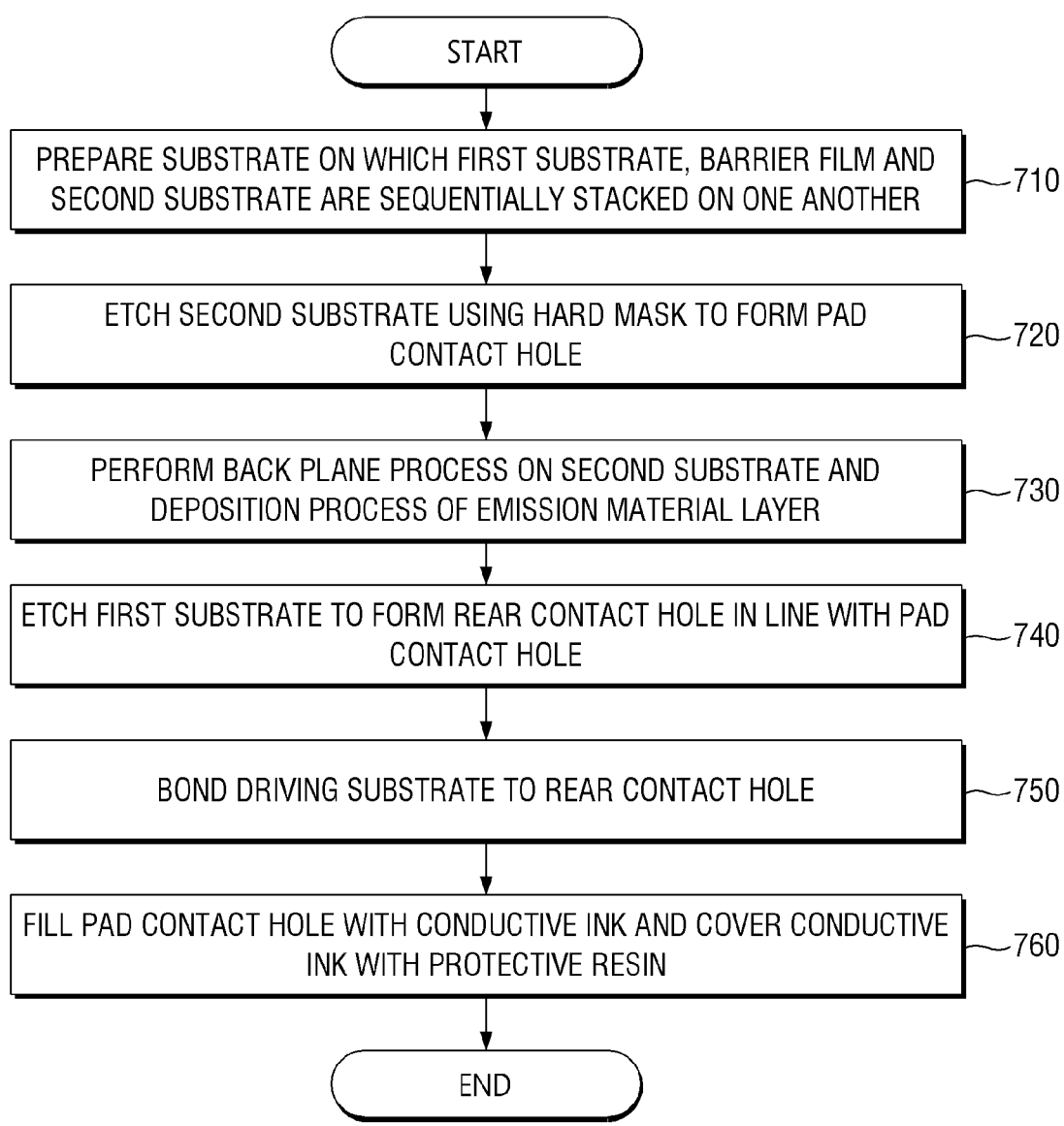
FIG. 7 is a flowchart for illustrating a method of fabricating a display device according to some embodiments of the present disclosure.
Figure 8:
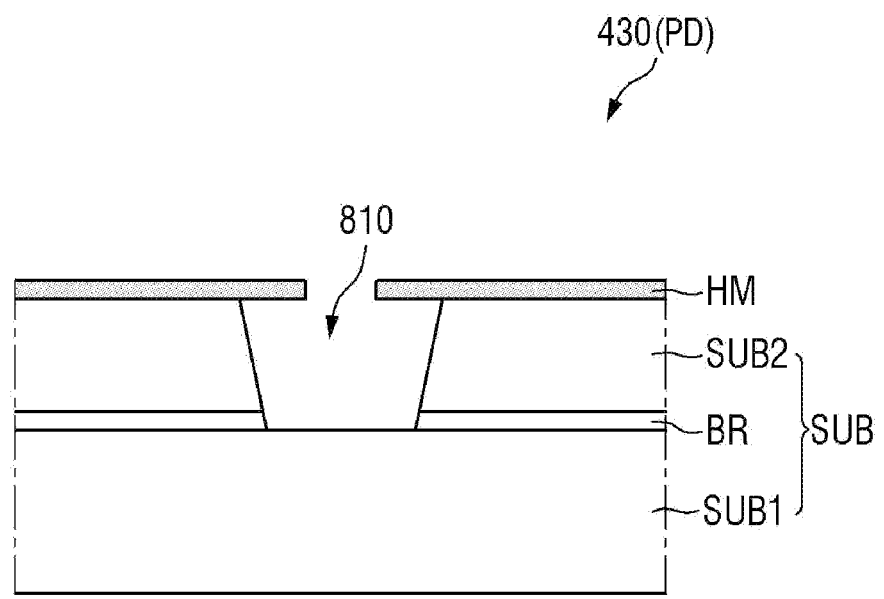
FIG. 8 is a cross-sectional view for illustrating a process of forming a pad contact hole using a hard mask.
Figure 9:
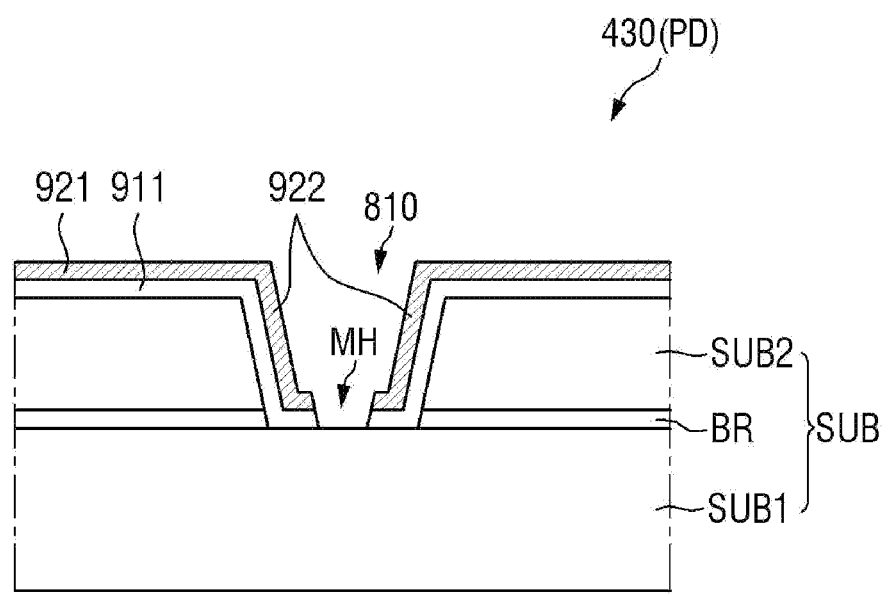
FIG. 9 is a cross-sectional view for illustrating a process of forming a pad electrode in the pad contact hole.
Figure 10:
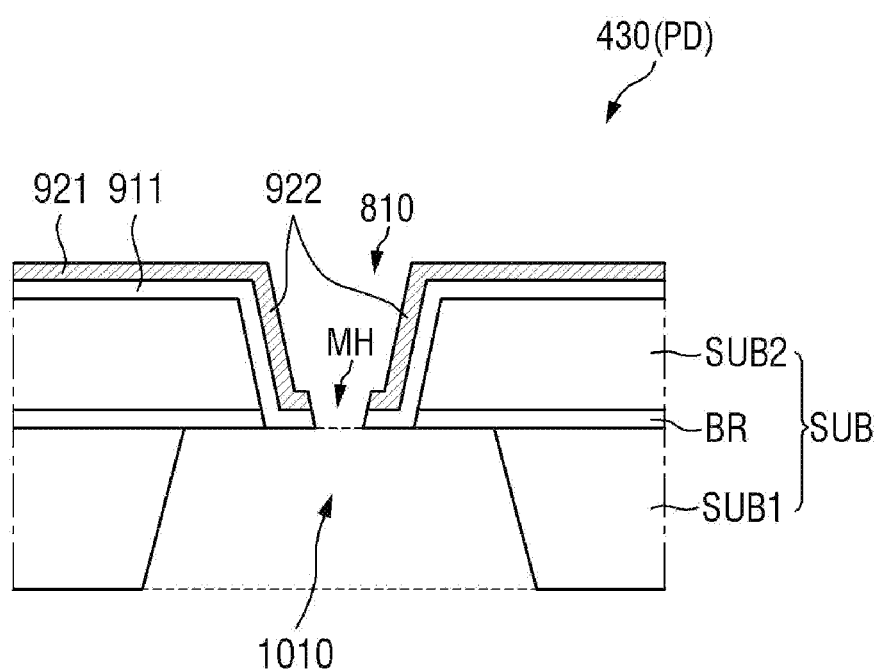
FIG. 10 is a cross-sectional view for illustrating a process of forming a rear contact hole to expose a part of a pad contact hole from a rear surface of the display panel.
Figure 11:
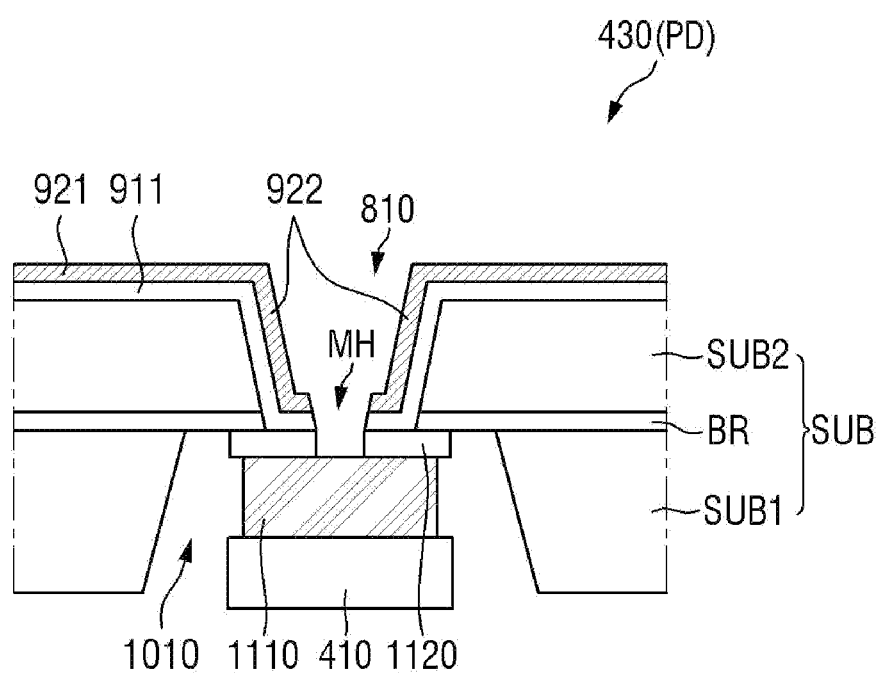
FIG. 11 is a cross-sectional view for illustrating a process of bonding a driving substrate to the rear contact hole.
Figure 12:
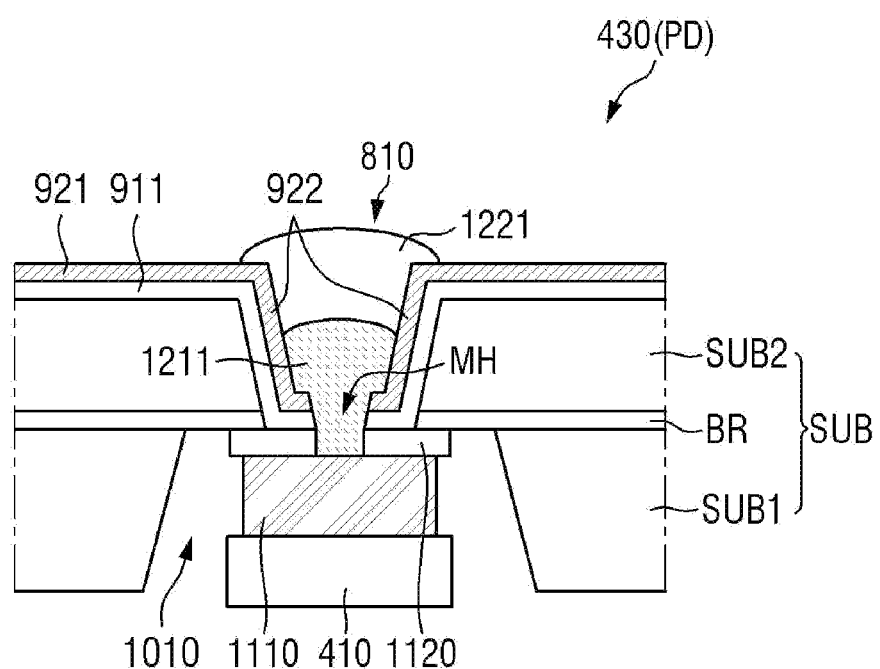
FIG. 12 is a cross-sectional view for illustrating a process of filling the pad contact hole with a conductive ink covering a pad electrode.

FIG. 7 is a flowchart for illustrating a method of fabricating a display device 1 according to some embodiments of the present disclosure. FIG. 8 is a cross-sectional view for illustrating a process of forming a pad contact hole 810 using a hard mask HM. FIG. 9 is a cross-sectional view for illustrating a process of forming pad electrodes 922 in the pad contact hole 810. FIG. 10 is a cross-sectional view for illustrating a process of forming a rear contact hole 1010 to expose a part of a pad contact hole 810 from the rear surface of the display panel 10. FIG. 11 is a cross-sectional view for illustrating a process of bonding a driving substrate 410 to the rear contact hole 1010. FIG. 12 is a cross-sectional view for illustrating a process of filling the pad contact hole 810 with a conductive ink 1211 covering a pad electrode 922.

At least some of the fabrication processes illustrated in FIG. 7 may be omitted. Before or after each of the fabrication processes illustrated in FIG. 7, fabrication processes described herein or known in the art may be additionally performed.

Hereinafter, a method of fabricating a display device 1 according to some embodiments will be described with reference to FIG. 7 in conjunction with FIGS. 8 to 12.

Referring to FIG. 7, in step 710, a substrate SUB is prepared by sequentially stacking a first substrate SUB1, a barrier film BR, and a second substrate SUB2. The first substrate SUB1 and the second substrate SUB2 may include a flexible material such as polyimide. The barrier film BR may be made up of multiple layers in which one or more inorganic layers of a silicon nitride layer, a silicon oxynitride layer, a silicon oxide layer, a titanium oxide layer and an aluminum oxide layer are alternately stacked on one another.

Referring to FIGS. 7 and 8, at step 720, a patterned hard mask HM is formed on the second substrate SUB2, and a pad contact hole 810 of a pad area 430 is formed at a portion of the non-display area NDA using the hard mask HM as an etch mask. The pad contact hole 810 penetrates the second substrate SUB2 and the barrier film BR to expose a part of the first substrate SUB1 on the front side of the substrate SUB. The hard mask HM may include ITO, IZO, IGZO, AlOx, ZrOx, or HfOx.

Referring to FIGS. 7 and 9, in step 730, a thin-film transistor layer TFTL, an emission material layer EML, an encapsulation layer TFEL, and a touch detecting unit TDU are sequentially formed. Step S730 is performed after the process of forming the pad contact hole 810 of the pad area 430 using the hard mask HM, and includes a backplane process of forming a thin film transistor layer TFTL. In step 730, when the thin-film transistor layer TFTL is formed, signal lines 611 for driving the pixels of the display area DA, power lines 612, and pad electrodes 922 may be formed together. As shown in FIG. 9, a pad connection line 921 may be connected to pad electrodes 922, and the pad connection line 921 may be one of a signal line, a power line, an electrostatic line and a touch connection line. The pad electrodes 922 and the pad connection line 921 may be formed in the same layer. The pad electrodes 922 and the pad connection line 921 may be located in the same layer as the first anode connection electrode ANDE1 or the second anode connection electrode ANDE2 in the display area DA.

The inner circumferential surface of the pad contact hole 810 is covered by at least one inorganic film 911 deposited in a backplane process. As a portion of the inorganic film 911 located inside the pad contact hole 810 is removed, a middle hole MH is formed, through which a portion of the first substrate SUB1 is exposed from the front side of the substrate SUB. For example, the inorganic films 911 (e.g., first inorganic films 911) are located inside the pad contact hole 810, and the inorganic films 911 form the middle hole MH that has a second width smaller than a first width of the pad contact hole 810 and exposes a portion of the first substrate SUB1 on the front side of the substrate SUB. Accordingly, the internal space of the pad contact hole 810 may have a stepped shape with the decreasing width toward the bottom. Herein, the inner circumferential surface of the pad contact hole 810 may refer to the side surfaces of the second substrate SUB2 and the side surfaces of the barrier film BR located inside the pad contact hole 810.

According to some embodiments, the pad electrodes 922 are extended from the signal lines 611 or the power lines 612, and are in contact with the inorganic films 911 located on the inner circumferential surface of the pad contact hole 810 and the inner circumferential surface of the middle hole MH formed by patterning the inorganic films 911.

Referring to FIGS. 7 and 10, in step 740, the first substrate SUB1 is etched to form a rear contact hole 1010 exposing a part of the pad contact hole 810 from the rear surface of the display panel 10. The process of forming the rear contact hole 1010 may employ a laser process or a chemical etching process. The rear contact hole 1010 may be a single hole that exposes a plurality of pad contact holes 810 from the rear surface of the display panel 10.

Referring to FIGS. 7 and 11, in step 750, a driving substrate 410 may be bonded to the rear contact hole 1010. For example, the driving substrate 410 may be a film-type substrate 410 such as a flexible printed circuit board (FPCB). In this instance, a bump, which is a pad 1110 of the driving substrate 410, may be attached to the rear contact hole 1010 using an adhesive 1120 such as a pressure sensitive adhesive (PSA) and an optically clear adhesive (OCA). It should be noted that the driving substrate 410 is not limited to a film-type substrate SUB such as a flexible printed circuit board (FPCB), and may be a flexible substrate for mounting an integrated circuit such as COP (chip on plastic). For example, the flexible substrate may be a substrate formed via the same process as the substrate SUB of the display panel 10. For example, the driving substrate 410, like the substrate SUB of the display panel 10 described with reference to FIG. 8, may include a substrate DSUB (see FIG. 16) in which a first substrate DSUB1 (see FIG. 16), a barrier film DBR (see FIG. 16) and a second substrate DSUB2 (see FIG. 16) are sequentially stacked on one another.

Referring to FIGS. 7 and 12, in step 760, the inside of the pad contact hole 810 is filled with a conductive ink 1211 (e.g., metal ink), and the conductive ink 1211 may be covered with a protective resin 1221. The conductive ink 1211 may be in contact with the pad electrodes 922 inside the pad contact hole 810 and may be in contact with the pad 1110 of the driving substrate 410 through the rear contact hole 1010. Accordingly, the driving substrate 410 located on the rear side of the substrate SUB and the pad electrodes 922 may be electrically connected with each other through the conductive ink 1211.

Hereinafter, a pad area 430 according to some embodiments will be described in more detail with reference to FIGS. 13 to 37. The pad area 430 may include a plurality of pads PD. The plurality of pads PD may include signal pads electrically connected to signal lines 611 for driving pixels in the display area DA, power pads electrically connected to power lines, electrostatic pads electrically connected to electrostatic lines 614, and touch driving pads electrically connected to touch connection lines 613. Accordingly, the pad PD described with reference to FIGS. 13 to 37 may mean one of the signal pads, the power pads, the electrostatic pads, and the touch driving pads. In other words, although FIGS. 13 to 37 show one pad PD included in the pad area 430, the pad PD shown in the drawings may be one of signal pads, power pads, electrostatic pads, and touch driving pads.

Figure 13:
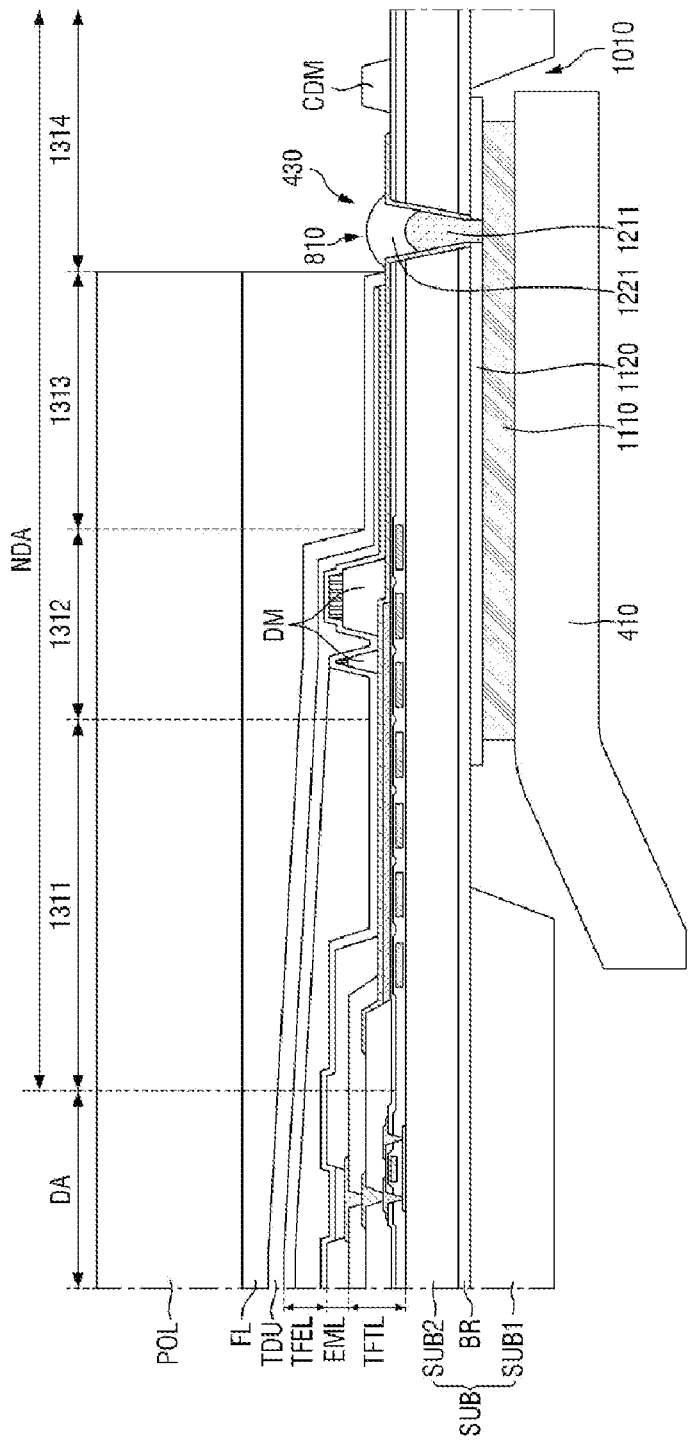
FIG. 13 is a cross-sectional view showing a structure of a portion of a non-display area of a display panel according to some embodiments.
Figure 14:
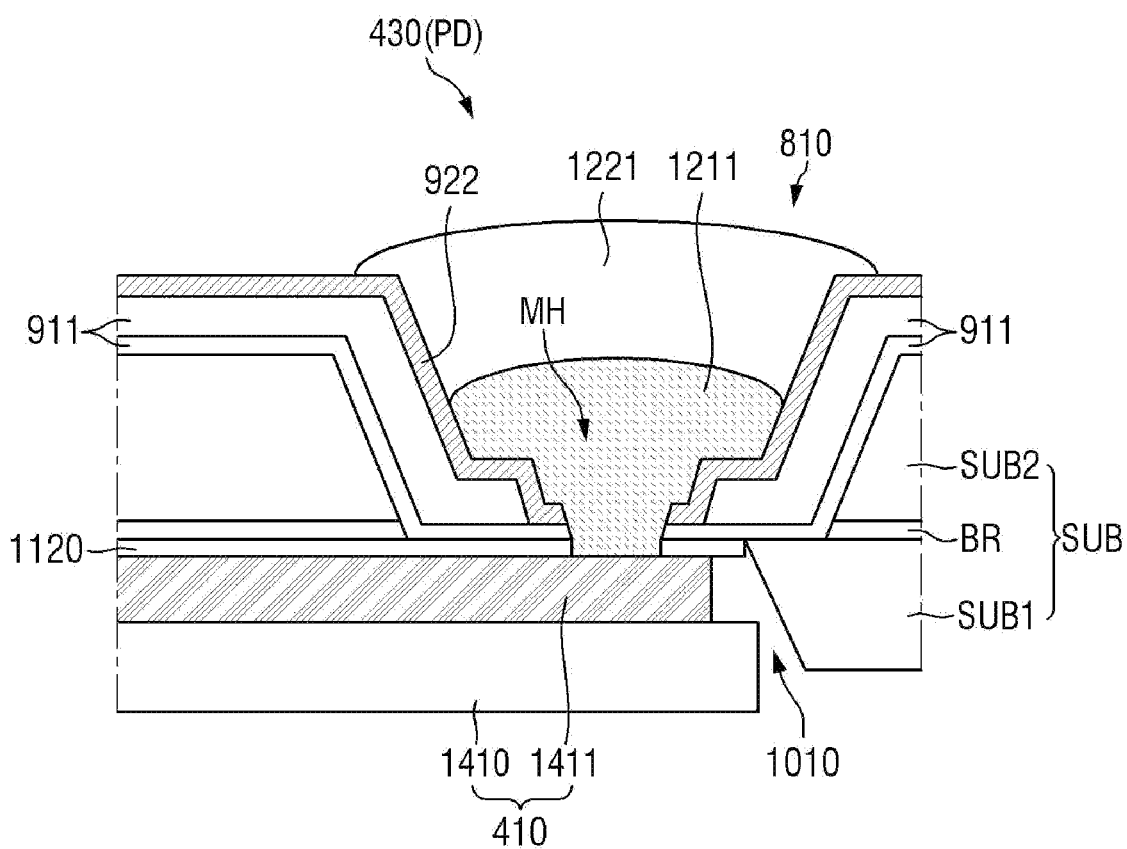
FIG. 14 is a cross-sectional view of a portion of the display panel specifically showing the pad area shown in FIG. 13.

FIG. 13 is a cross-sectional view showing a structure of a portion of the non-display area NDA of the display panel 10 according to some embodiments. FIG. 14 is a cross-sectional view of a portion of the display panel 10 specifically showing the pad area 430 shown in FIG. 13.

Referring to FIGS. 13 and 14, the display panel 10 according to some embodiments may include the substrate SUB, and the substrate SUB may be a flexible substrate in which a first substrate SUB1, a barrier film BR and a second substrate SUB2 are sequentially stacked on one another.

According to some embodiments, the display panel 10 includes a display area DA and a non-display area NDA. Accordingly, the substrate SUB may be divided into the display area DA and the non-display area NDA.

As described with reference to FIG. 5, a thin film transistor layer TFTL, an emission material layer EML, an encapsulation layer TFEL, and a touch detecting unit TDU are sequentially formed in the display area DA. A planarization layer FL such as an inkjet resin may be located on the touch detecting unit TDU, and a polarization layer POL may be located on the planarization layer FL.

The non-display area NDA may include a fan-out wiring area 1311 where signal lines 611 and power lines 612 are located; a dam area 1312 located on the outer side the fan-out wiring area 1311 and including at least one dam DM; an inorganic encapsulation area 1313 where only an inorganic encapsulation film is formed; and an outermost area 1314 located on the outer side of the inorganic encapsulation area 1313.

According to some embodiments, a pad area 430 and an anti-crack dam CDM may be located in the outermost area 1314. The signal lines 611 and the power lines 612 located in the fan-out wiring area 1311 may be extended to the pad area 430 located in the outermost area 1314 via the dam area 1312 and the inorganic encapsulation area 1313. The outermost area 1314 of the non-display area NDA may be referred to as an anti-crack area because the anti-crack dam CDM is located, or as an unencapsulated area because no encapsulation layer is formed. It should be understood, however, that the present disclosure is not limited thereto.

In the outermost area 1314, the encapsulation layer TFEL, the planarization layer FL or the polarization layer POL is not located, and the pad area 430 may be located. The pad area 430 may be electrically connected to the driving substrate 410 located on the rear side of the display panel 10 using a conductive ink 1211 in at least one of the pad contact hole 810 or the rear contact hole 1010. It should be noted that in some embodiments, the pad area 430 may not be located in the outermost area 1314 but may be located in the inorganic encapsulation area 1313 (see FIG. 17).

According to some embodiments, the pad area 430 may be located in the outermost area 1314 of the non-display area NDA where the encapsulation layer TFEL is not formed. The pad area 430 is electrically connected to the driving substrate 410 using the conductive ink 1211 (e.g., an upper conductive ink 1211) in the pad contact hole 810.

Hereinafter, the features of the pad area 430 will be described in more detail with reference to FIG. 14.

Referring to FIG. 14, each of the plurality of pads PD included in the pad area 430 includes a pad contact hole 810 formed by etching the second substrate SUB2 and the barrier film BR, and a rear contact hole 1010 in line with the pad contact hole 810 and formed by etching the first substrate SUB1. The driving substrate 410 is bonded to the rear contact hole 1010 using an adhesive 1120.

According to some embodiments, first inorganic films 911 and pad electrodes 922 covering the first inorganic films 911 are located on the inner circumferential surface of the pad contact hole 810. The first inorganic film 911 is located in the same layer as at least some of the inorganic films 130, 141, and 142 (see FIG. 5) included in the thin-film transistor layer TFTL. That is to say, the first inorganic films 911 covering the pad contact hole 810 may be formed during a backplane process of forming a thin-film transistor layer TFTL. The first inorganic films 911 form a middle hole MH that connects the pad contact hole 810 with the rear contact hole 1010. The middle hole MH may be formed during the backplane process of forming the thin-film transistor layer TFTL.

According to some embodiments, the middle hole MH may be located at the center of the pad contact hole 810. The diameter of the middle hole MH may be smaller than the diameter of the pad contact hole 810.

According to some embodiments, the pad electrode 922 may be located in the same layer as the source electrode or drain electrode of a thin-film transistor included in the thin-film transistor layer TFTL. For example, the pad electrode 922 may be located in the same layer as the first anode connection electrode ANDE1 or the second anode connection electrode ANDE2 described above with reference to FIG. 5. This pad electrode 922 may cover entirety or at least a part of the middle hole MH, which is an opening of the first inorganic film 911.

According to some embodiments, the inside of the pad contact hole 810 may be filled with a conductive ink 1211. The conductive ink 1211 may cover the middle hole MH and a part of the pad electrode 922. A protective resin 1221 may be located on the conductive ink 1211.

According to some embodiments, the driving substrate 410 may be bonded to the bottom of the rear contact hole 1010. The driving substrate 410 according to some embodiments may include a substrate 1410 in the form of a flexible printed circuit board (FPCB), and a driver chip 411 located on the substrate 1410 in the form of a chip on film (COF). For example, the driving substrate 410 may include a substrate 1410 and a pad 1411 (e.g., bump) located on the substrate 1410. The pad 1411 of the driving substrate 410 is bonded directly to the bottom of the rear contact hole 1010 by the adhesive 1120 and thus may be in contact with the middle hole MH. The pad 1411 of the driving substrate 410 may be electrically connected to the pad electrodes 922 through the conductive ink 1211 that covers the middle hole MH and the pad electrode 922.

Herein, the driving substrate 410 is not limited to an FPCB. For example, the driving substrate 410 may be a flexible substrate (e.g., the substrate DSUB in FIG. 16) that is the same as or similar to the substrate SUB of the display panel 10.

Figure 15:
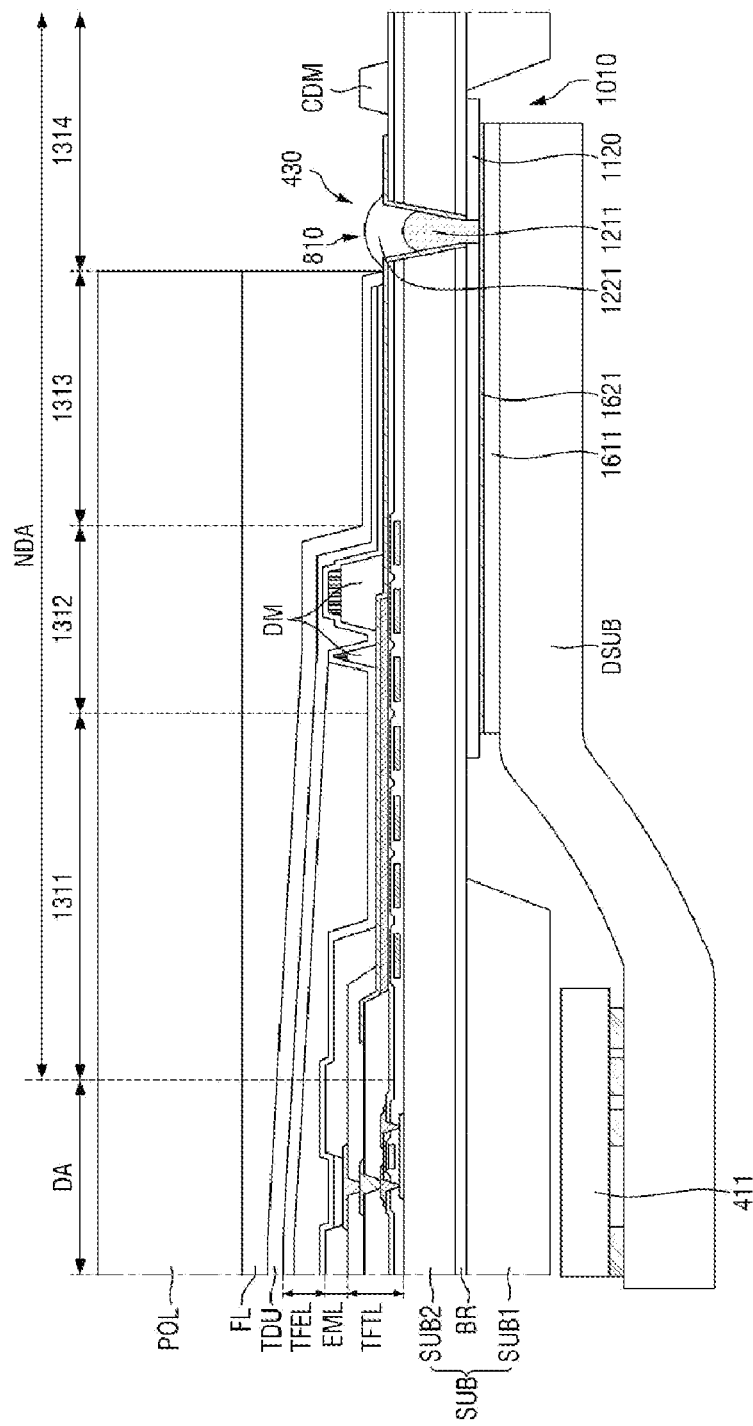
FIG. 15 is a view showing an example in which the driving substrate shown in FIG. 13 is implemented as a flexible substrate.
Figure 16:
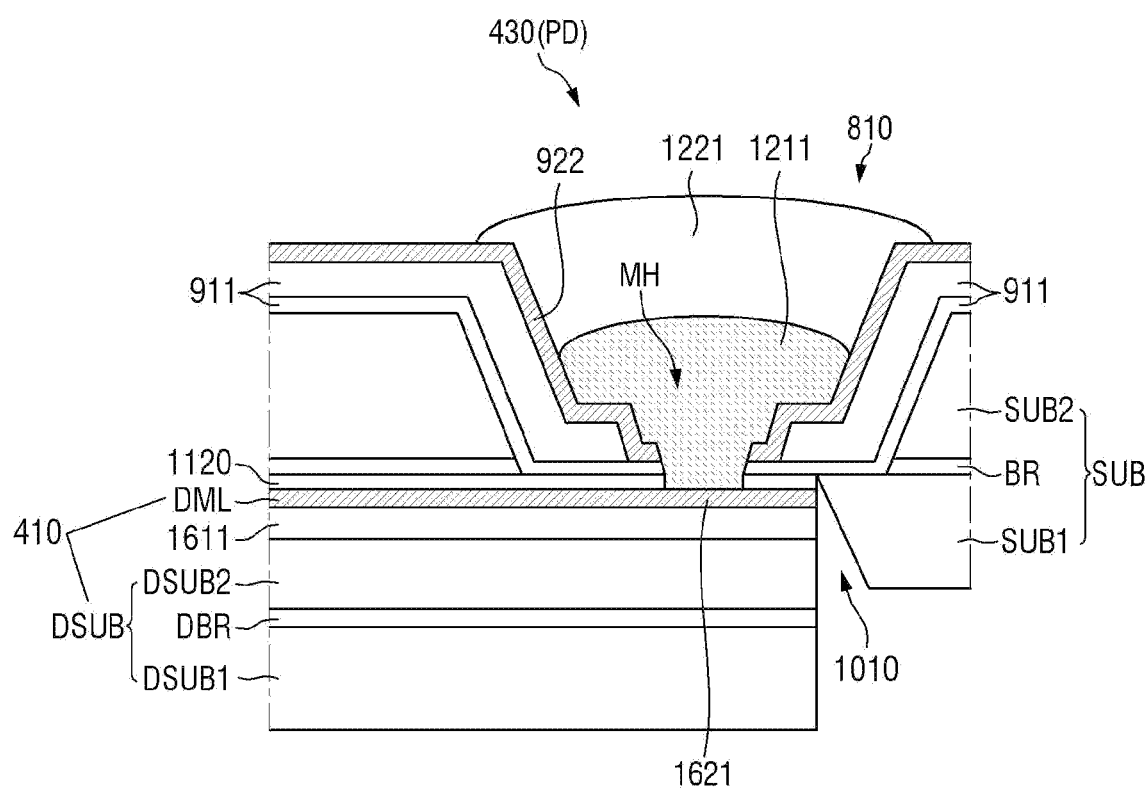
FIG. 16 is a cross-sectional view of a portion of the display panel specifically showing the pad contact hole shown in FIG. 15.

FIGS. 15 and 16 show embodiments in which the driving substrate 410 is implemented as a flexible substrate that is the same as or similar to the substrate SUB of the display panel 10. For example, FIG. 15 is a view showing an example in which the driving substrate 410 shown in FIG. 13 is implemented as a flexible substrate. FIG. 16 is a cross-sectional view of a portion of the display panel 10, for example, the pad contact hole 810 shown in FIG. 15.

The embodiments illustrated with respect to FIGS. 15 and 16 are substantially identical to the embodiments illustrated with respect to FIGS. 13 and 14 except that the driving substrate 410 is implemented as a flexible substrate that is the same as or similar to the substrate SUB of the display panel 10; and, therefore, some redundant descriptions of similar components may be omitted.

Referring to FIGS. 15 and 16, the driving substrate 410 according to some embodiments may include a substrate DSUB and a driver chip 411 located on the substrate DSUB. The substrate DSUB of the driving substrate 410 may be a flexible substrate substantially the same as the substrate SUB of the display panel 10. For example, the driving substrate 410 and the substrate SUB of the display panel 10 may be substrates SUB and DSUB produced from a single mother substrate. The driving substrate 410 and the substrates SUB and DSUB of the display panel 10 may be separated via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. The first substrate DSUB1 of the driving substrate 410 may be formed via the same process as the first substrate SUB1 of the display panel 10. The barrier film DBR of the driving substrate 410 may be formed via the same process as the barrier film BR of the display panel 10. The second substrate DSUB2 of the driving substrate 410 may be formed via the same process as the second substrate SUB2 of the display panel 10.

According to some embodiments of the present disclosure, an inorganic film 1611 and a metal layer DML forming a lead line and a pad 1621 may be located on the second substrate DSUB2 of the driving substrate 410, and they may be made of the same materials as the first inorganic film 911 and the pad electrode 922 included in the display panel 10 via the same processes, respectively. According to some embodiments, the pad 1621 of the driving substrate 410 is an electrode extended from the lead line and may be bonded directly to the bottom of the rear contact hole 1010 by the adhesive 1120. The pad 1621 of the driving substrate 410 may be electrically connected to the pad electrodes 922 through the conductive ink 1211 that covers the middle hole MH and the pad electrode 922.

Figure 17:
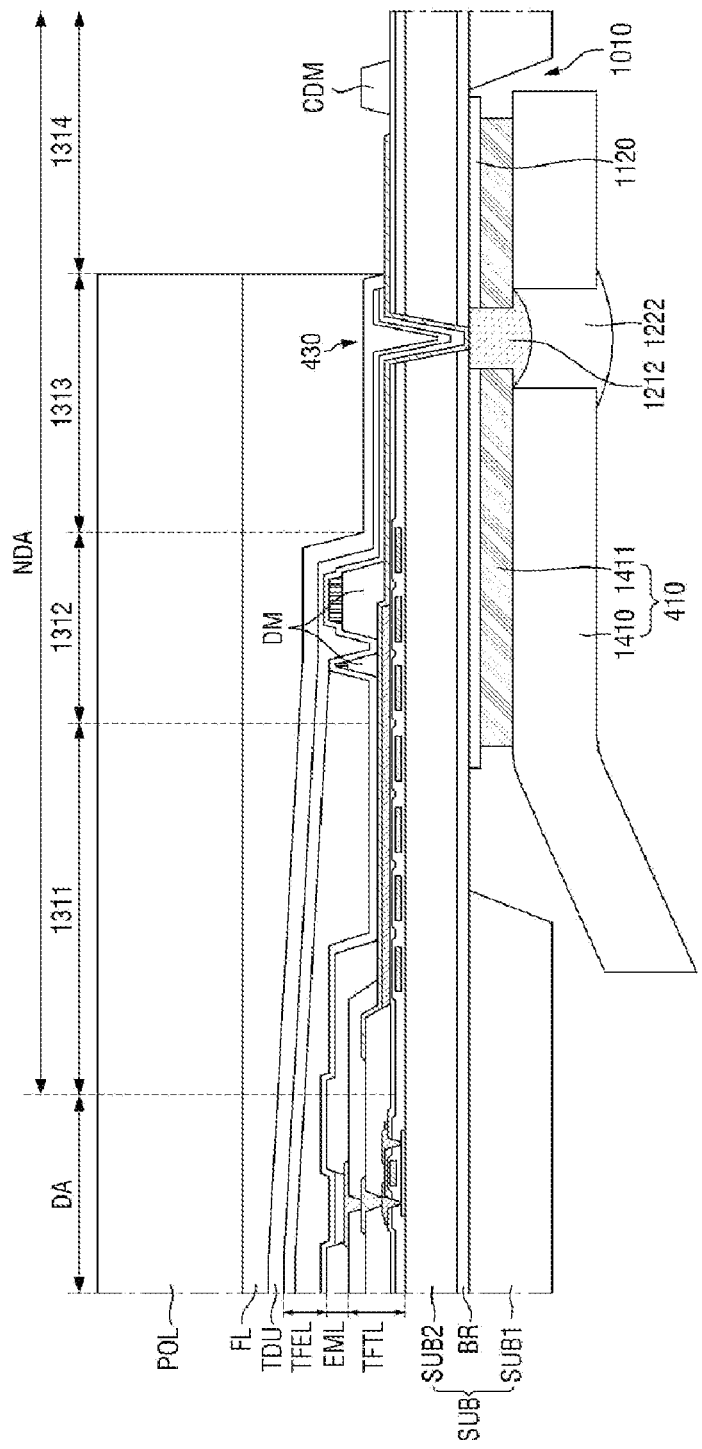
FIG. 17 is a cross-sectional view of a display panel according to some embodiments in which a pad electrode and a driving substrate are electrically connected with each other by a conductive ink filling a rear contact hole
Figure 18:
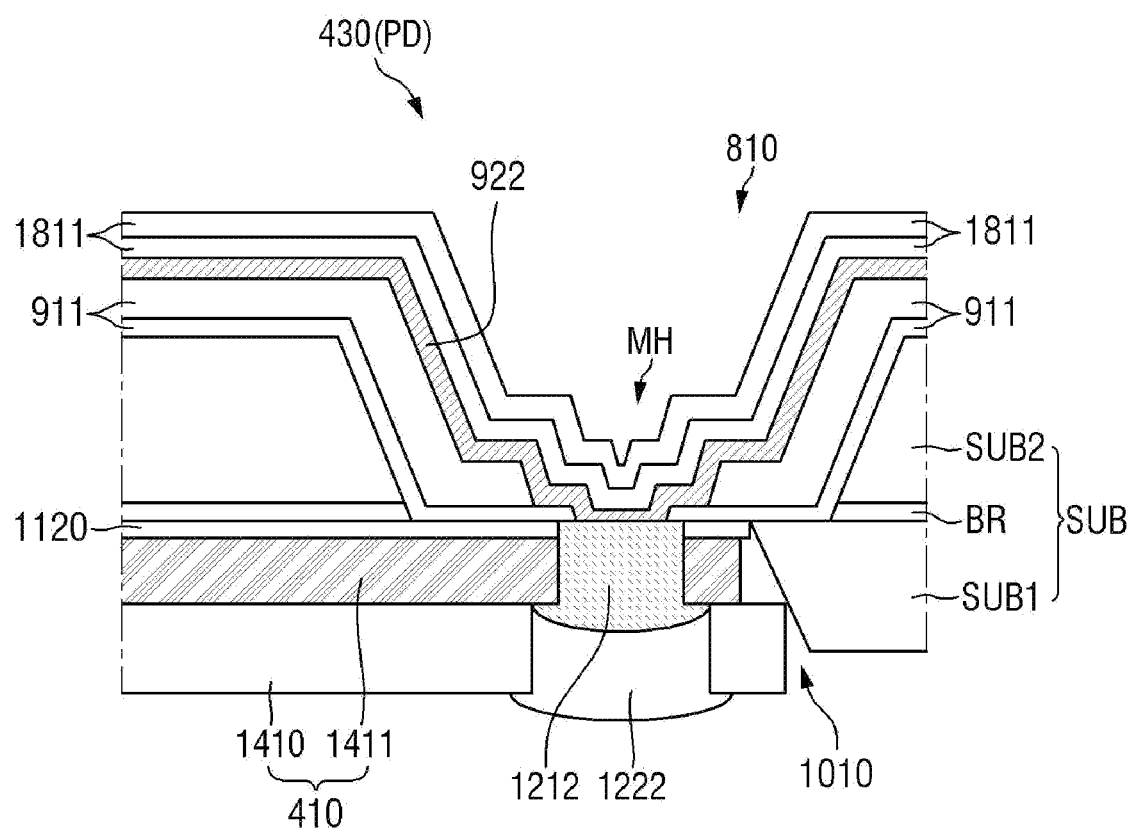
FIG. 18 is a cross-sectional view of a portion of the display panel showing aspects of the pad contact hole shown in FIG. 17 according to some embodiments.

FIG. 17 is a cross-sectional view of a display panel 10 according to some embodiments in which a pad electrode 922 and a driving substrate 410 are electrically connected with each other by a conductive ink 1211 filling a rear contact hole 1010. FIG. 18 is a cross-sectional view of a portion of the display panel 10, specifically, the pad contact hole 810 shown in FIG. 17.

The embodiments illustrated with respect to FIG. 17 are substantially identical to the embodiments illustrated with respect to FIGS. 13 and 14 except that a rear contact hole 1010 is filled with a conductive ink 1211; and, therefore, some redundant descriptions of similar components may be omitted.

Referring to FIGS. 17 and 18, the driving substrate 410 according to some embodiments may include a substrate 1410 in the form of a flexible printed circuit board (FPCB), and a driver chip located on the substrate 1410 in the form of a chip on film (COF).

According to some embodiments, a pad area 430 may be located in the non-display area NDA and may be located where an encapsulation layer TFEL is formed. For example, the pad area 430 may be located in an inorganic encapsulation area 1313 where only an inorganic encapsulation film is formed.

According to some embodiments, each of a plurality of pads PD may be formed by a pad contact hole 810 formed by etching a second substrate SUB2 and a barrier film BR, a first inorganic film 911 and a pad electrode 922 sequentially stacked on the inner circumferential surface of the pad contact hole 810, and an etched part of the first substrate SUB1 in line with the pad contact hole 810. The pad 1411 of the driving substrate 410 may include a rear contact hole 1010 bonded to the bottom surface.

According to some embodiments, the first inorganic film 911 forms a middle hole MH that connects the pad contact hole 810 with the rear contact hole 1010. The pad electrode 922 is arranged to at least partially cover the middle hole MH.

According to some embodiments, the pad 1411 of the driving substrate 410 may be electrically connected to the pad electrode 922 covering the middle hole MH through a lower conductive ink 1212.

According to some embodiments, the driving substrate 410 may include a pad 1411 bonded to the bottom of the rear contact hole 1010, a pad hole penetrating a part of the pad 1411 aligned with the middle hole MH in the thickness direction, a lower conductive ink 1212 covering the inner circumferential surface of the pad hole, and a protective resin 1221 covering the lower conductive ink 1212.

According to some embodiments, a second inorganic film 1811 covering the pad electrode 922 may be located on the inner circumferential surface of the pad contact hole 810. The second inorganic film 1811 may be located in the same layer as the inorganic films TFE1 and TFE3 (see FIG. 5) included in the encapsulation layer TFEL of the display area DA. For example, the second inorganic film 1811 may be located in the same layer as the first encapsulation inorganic film TFE1 and the second encapsulation inorganic film TFE3 described above with reference to FIG. 5.

Figure 19:
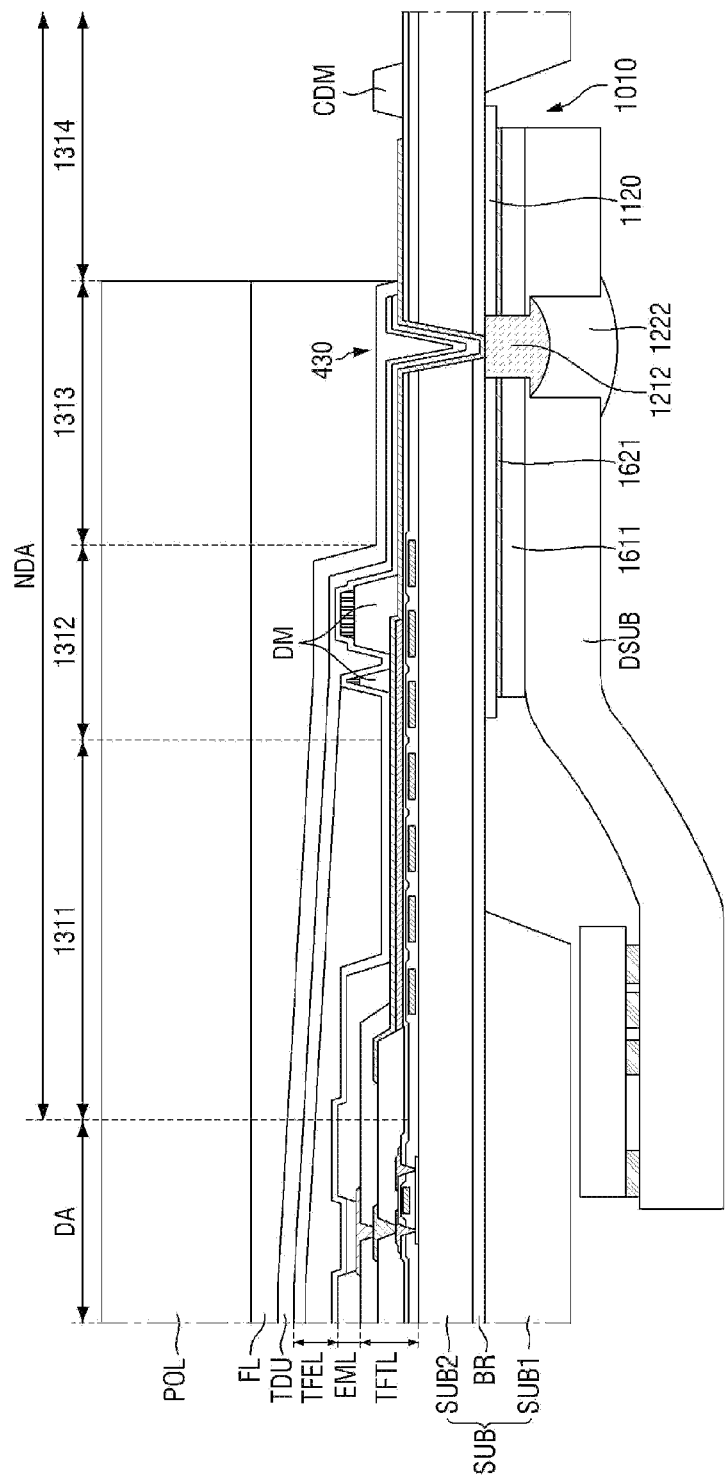
FIG. 19 is a view showing an example in which the driving substrate shown in FIG. 17 is implemented as a flexible substrate.
Figure 20:
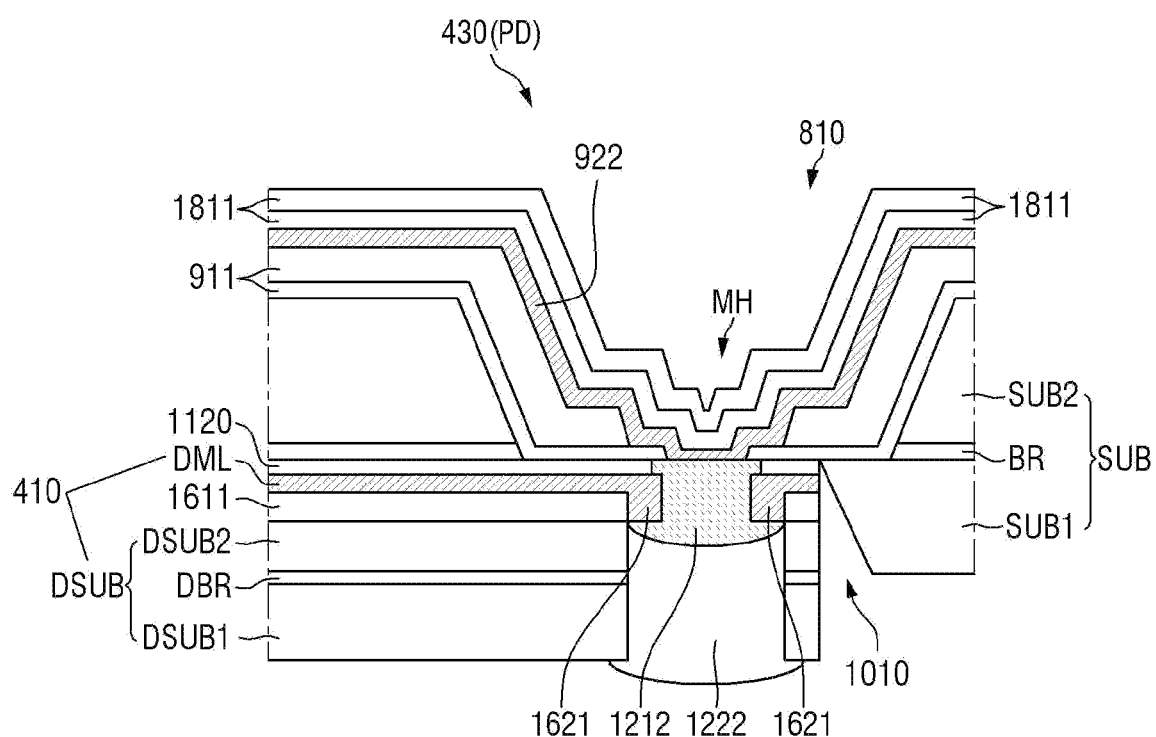
FIG. 20 is a cross-sectional view of a portion of the display panel showing aspects of the pad contact hole shown in FIG. 19 according to some embodiments.

FIG. 19 is a view showing an example in which the driving substrate 410 shown in FIG. 17 is implemented as a flexible substrate. FIG. 20 is a cross-sectional view of a portion of the display panel 10, specifically, the pad contact hole 810 shown in FIG. 19.

The embodiments illustrated with respect to FIGS. 19 and 20 are substantially identical to the embodiments illustrated with respect to FIGS. 17 and 18 except that the driving substrate 410 is implemented as a flexible substrate that is the same as or similar to the substrate SUB of the display panel 10; and, therefore, some redundant descriptions of similar components may be omitted.

Referring to FIGS. 19 and 20, the driving substrate 410 according to some embodiments may include a substrate DSUB and a driver chip located on the substrate DSUB. The substrate DSUB of the driving substrate 410 may be a flexible substrate substantially the same as the substrate SUB of the display panel 10. For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. An inorganic film 1611 and a metal layer DML forming a lead line and a pad 1621 may be located on the second substrate DSUB2 of the driving substrate 410, and they may be made of the same materials as the first inorganic film 911 and the pad electrode 922 included in the display panel 10 via the same processes, respectively.

According to some embodiments, the pad 1621 of the driving substrate 410 may be an electrode extended from a lead line and may be bonded directly to the bottom of a rear contact hole 1010 by an adhesive 1120. The pad of the driving substrate 410 may have a bent shape at the pad hole, and may be arranged to cover a side surface of the inorganic film 1611 accordingly.

Figure 21:
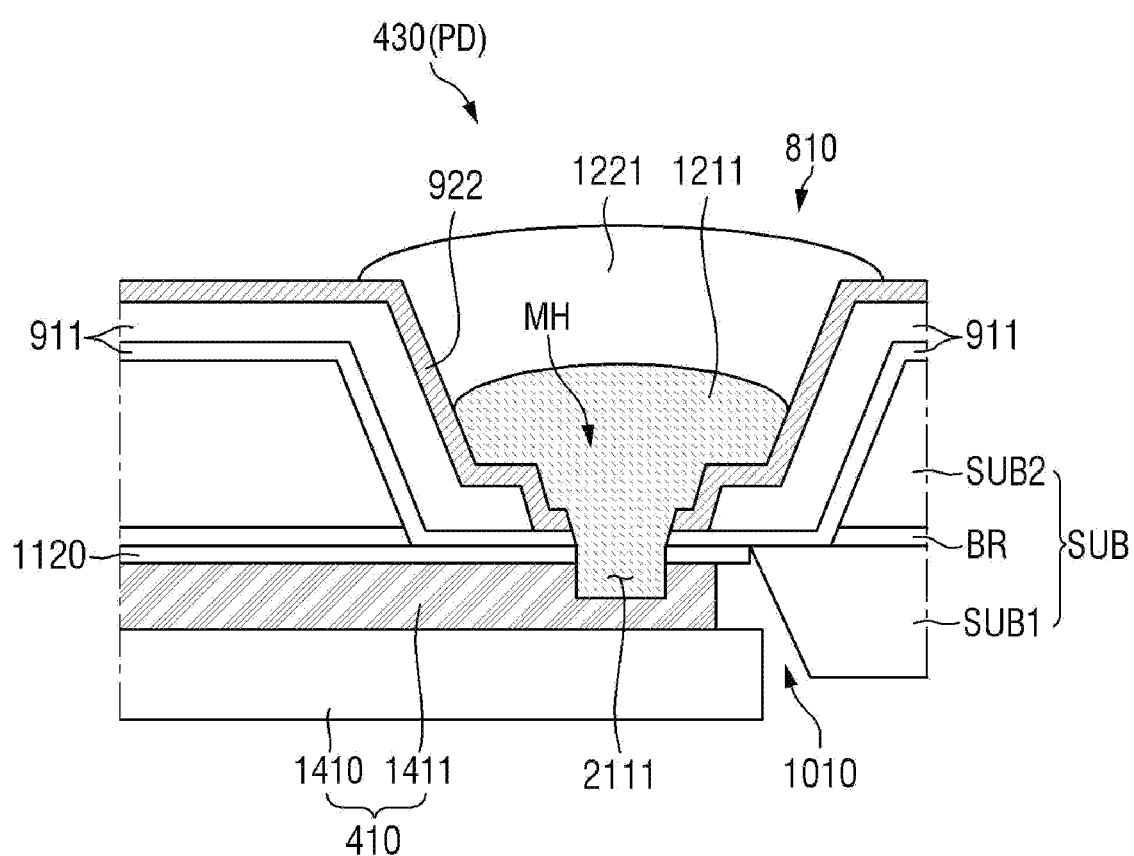
FIG. 21 is a cross-sectional view of a portion of a display panel, specifically, a pad contact hole according to some embodiments in which a contact area of a conductive ink is increased by etching a part of a bump included in a driving substrate.

FIG. 21 is a cross-sectional view of a portion of the display panel 10, specifically, a pad contact hole 810 according to some embodiments in which a contact area of a conductive ink 1211 is increased by etching a part of a bump included in a driving substrate 410.

The embodiments illustrated with respect to FIG. 21 are substantially identical to the embodiments illustrated with respect to FIG. 13 except that a groove 2111 is formed in the pad 1411 of the driving substrate 410; and, therefore, some redundant descriptions of similar components may be omitted.

Referring to FIG. 21, the pad 1411 of the driving substrate 410 according to some embodiments may include the groove 2111 aligned with a middle hole MH. The groove 2111 formed in the pad 1411 may be formed by performing an etching process to etch at least a part of the pad 1411. As shown in the drawings, the groove 2111 of the pad 1411 may be filled with a part of an upper conductive ink 1211 in the middle hole MH.

Figure 22:
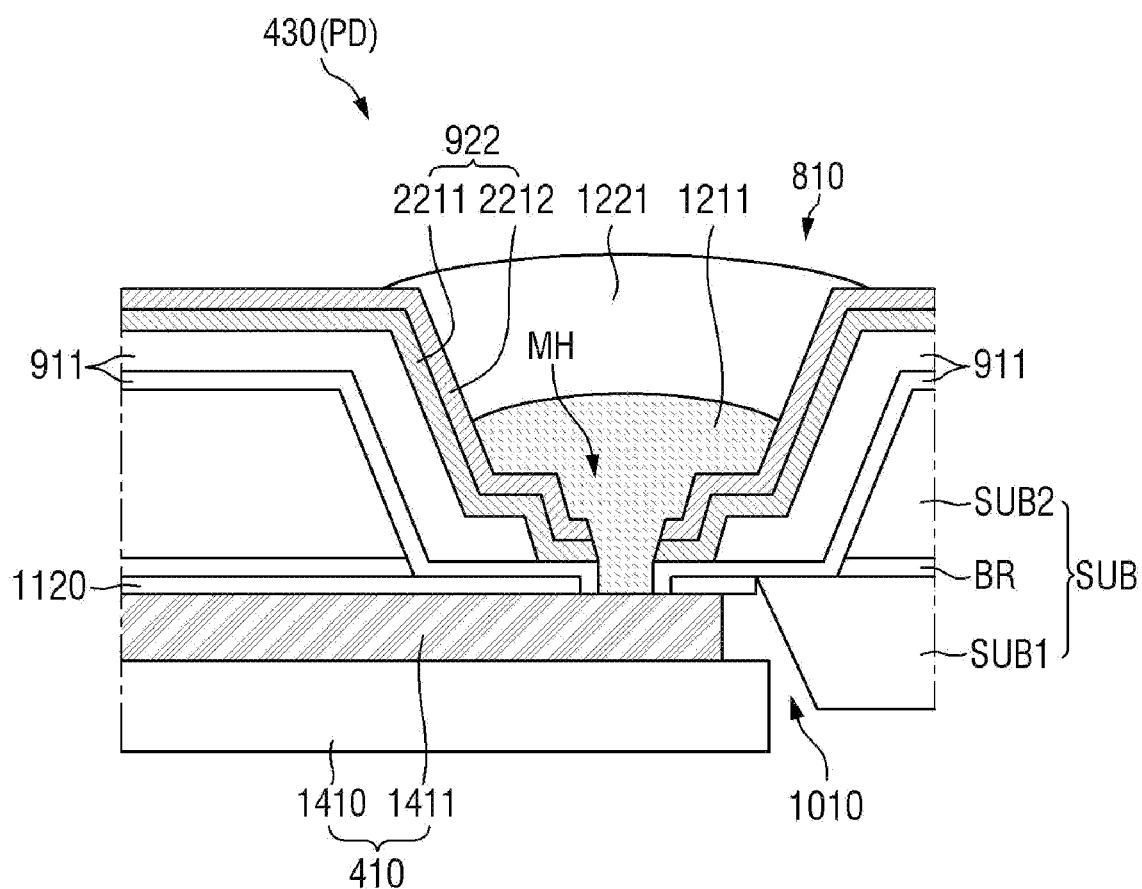
FIG. 22 is a cross-sectional view of a portion of a display panel, specifically, a pad contact hole according to some embodiments in which a pad electrode is made up of a plurality of metal layers.

FIG. 22 is a cross-sectional view of a portion of the display panel 10, specifically, the pad contact hole 810 according to some embodiments in which a pad electrode 922 is made up of a plurality of metal layers.

The embodiments illustrated with respect to FIG. 22 are substantially identical to the embodiments illustrated with respect to FIGS. 13 and 14 except that a pad electrode 922 is formed using a plurality of metal layers 2211 and 2212; and, therefore, some redundant descriptions of similar components may be omitted.

Referring to FIG. 22, the pad electrode 922 according to some embodiments may include a plurality of metal layers 2211 and 2212. For example, the pad electrode 922 may include a first pad electrode 2211 covering the first inorganic film 911, and a second pad electrode 2212 covering the pad electrode 922. For example, the first pad electrode 2211 may be located in the same layer as the first anode connection electrode ANDE1 described above with reference to FIG. 5, and the second pad electrode 2212 may be located in the same layer as the second anode connection electrode ANDE2 described above with reference to FIG. 5.

Figure 23:
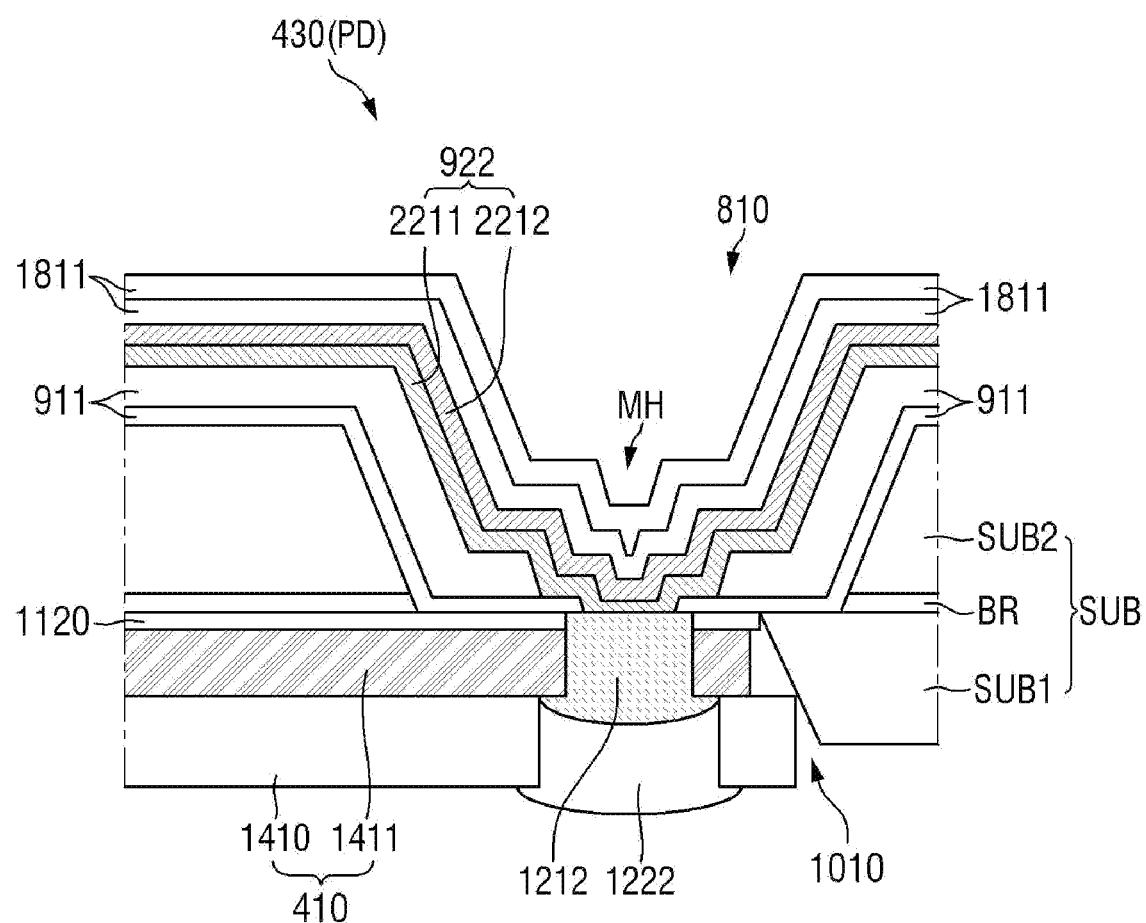
FIG. 23 is a cross-sectional view of a portion of a display panel according to some embodiments in which a pad electrode and a driving substrate are electrically connected with each other by a conductive ink filling a rear contact hole.

FIG. 23 is a cross-sectional view of a portion of a display panel 10 according to some embodiments in which a pad electrode 922 and a driving substrate 410 are electrically connected with each other by a conductive ink 1211 filling a rear contact hole 1010.

The embodiments illustrated with respect to FIG. 23 are substantially identical to the embodiments illustrated with respect to FIGS. 17 and 18 except that a pad electrode 922 is formed using a plurality of metal layers 2211 and 2212; and, therefore, some redundant descriptions of similar components may be omitted.

Referring to FIG. 23, the pad electrode 922 according to some embodiments may include a plurality of metal layers 2211 and 2212. For example, the pad electrode 922 may include a first pad electrode 2211 covering the first inorganic film 911, and a second pad electrode 2212 covering the pad electrode 922. For example, the first pad electrode 2211 may be located in the same layer as the first anode connection electrode ANDE1 described above with reference to FIG. 5, and the second pad electrode 2212 may be located in the same layer as the second anode connection electrode ANDE2 described above with reference to FIG. 5.

Figure 24:
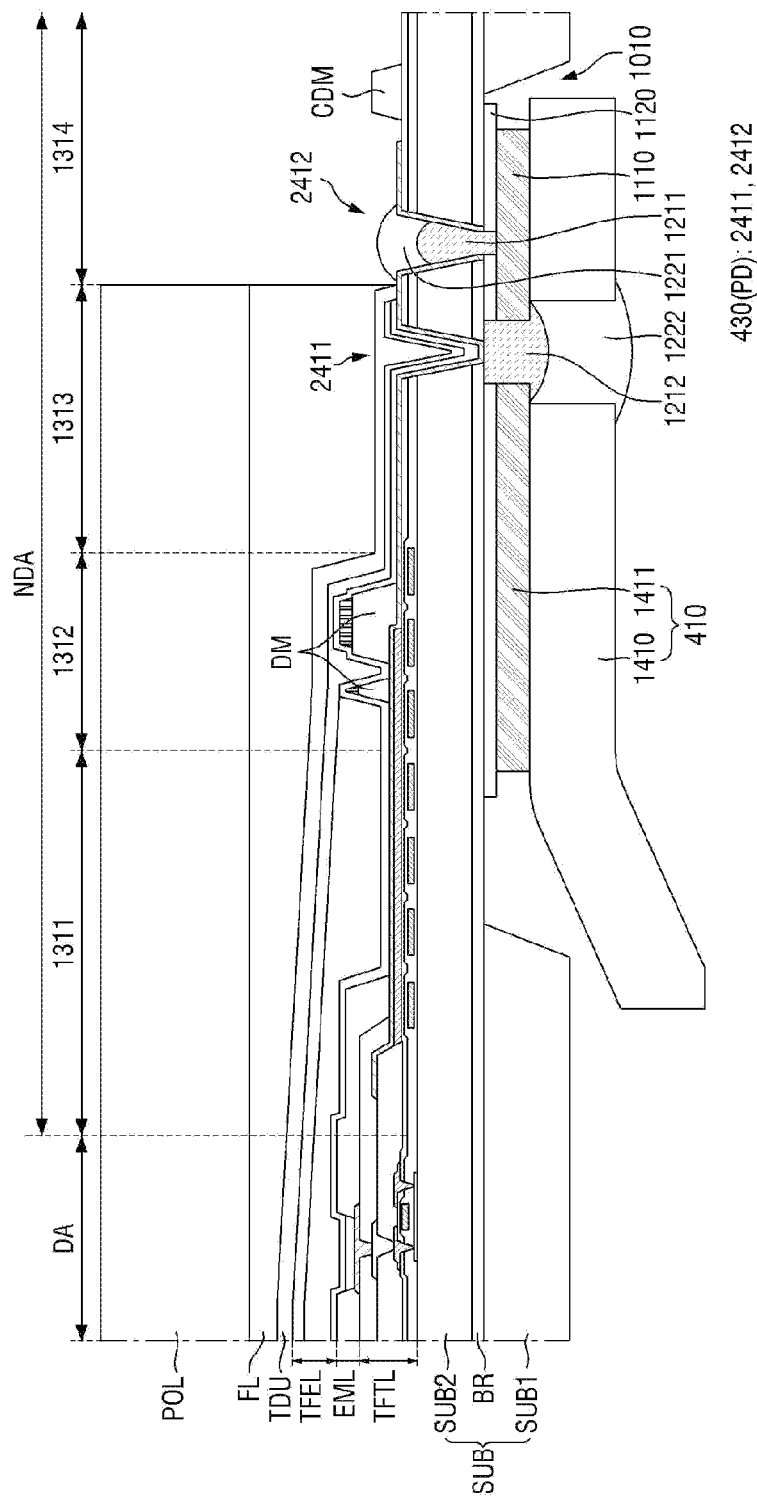
FIG. 24 is a cross-sectional view of a portion of a display panel including various types of pad contact holes according to some embodiments.

FIG. 24 is a cross-sectional view of a portion of the display panel 10 including various types of pad contact holes 810 according to some embodiments.

The embodiments illustrated with respect to FIG. 24 are substantially identical to the embodiments illustrated with respect to FIGS. 13 and 14 except that a pad area 430 includes at least one first pad 2411 located in an inorganic encapsulation area 1313, and at least one second pad 2412 located in an outermost area on the outer side of the inorganic encapsulation area 1313; and, therefore, the redundant descriptions will be omitted.

Referring to FIG. 24, a pad area 430 according to some embodiments may include a complex structure that includes a first pad 2411 located in the inorganic encapsulation area 1313, and a second pad 2412 located on the outer side of the inorganic encapsulation area 1313.

According to the embodiments illustrated with respect to FIG. 24, the first pad 2411 located in the inorganic encapsulation area 1313 may be substantially identical to the pad area 430 described above with reference to FIGS. 17 and 18.

According to the embodiments illustrated with respect to FIG. 24, the second pad 2412 located on the outer side of the inorganic encapsulation area 1313 may be substantially identical to the pad area 430 described above with reference to FIGS. 13 and 14.

According to some embodiments, the first pad 2411 and the second pad 2412 may be pads PD that transmit the same signal or the same supply voltage. For example, a signal applied to the first pad 2411 may be identical to a signal applied to the second pad 2412. Alternatively, the supply voltage applied to the first pad 2411 may be identical to the supply voltage applied to the second pad 2412. To this end, the first pad 2411 and the second pad 2412 may be located adjacent to each other and ma form a pair.

According to some embodiments, the first pad 2411 and the second pad 2412 may be pads PD that transmit different signals or different supply voltages. That is to say, the first pad 2411 and the second pad 2412 may be driven independently of each other.

Figure 25:
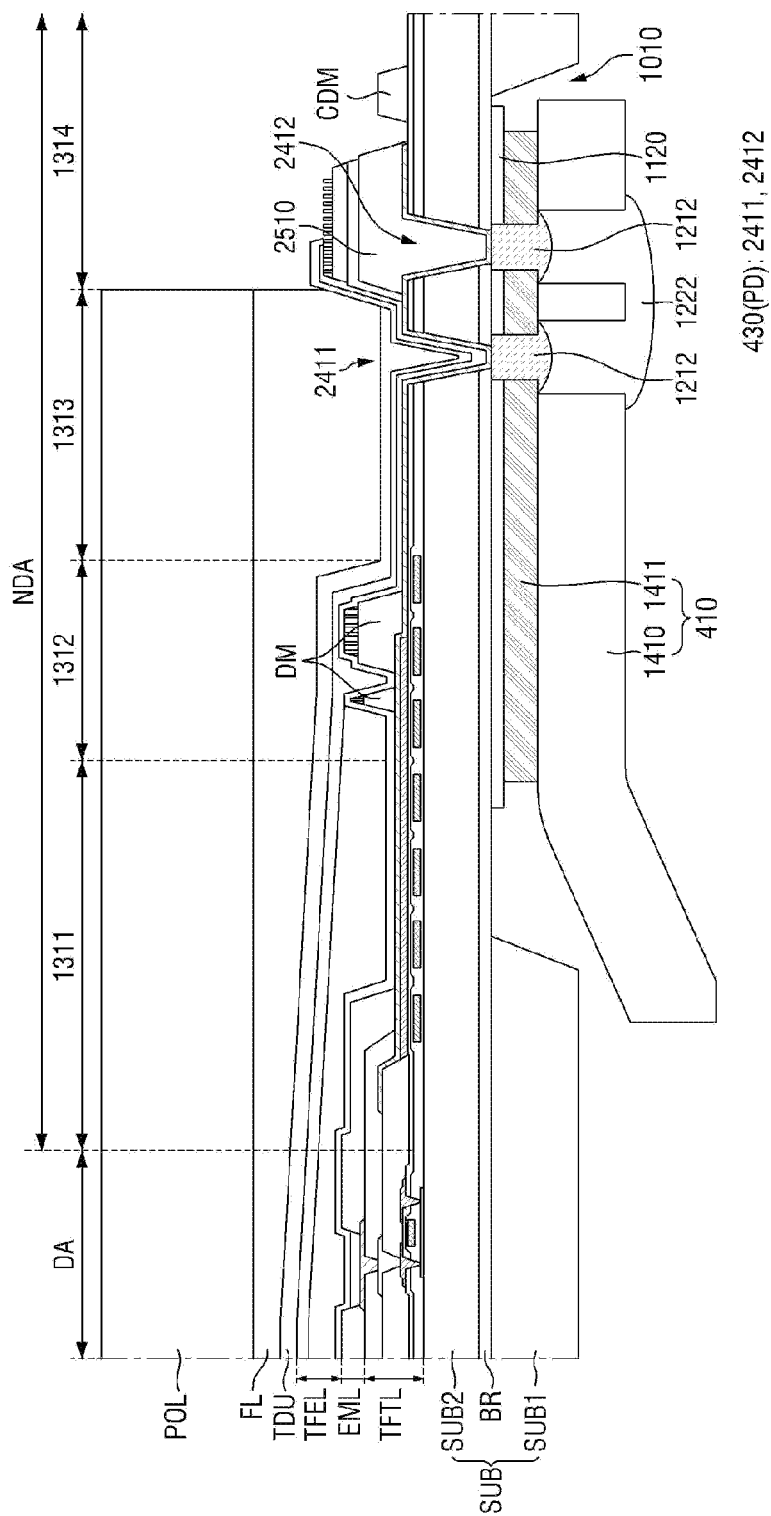
FIG. 25 is a cross-sectional view of a portion of a display panel according to some embodiments in which an organic protective film is formed on some of pad contact holes.

FIG. 25 is a cross-sectional view of a portion of the display panel 10 according to some embodiments in which an organic protective film is formed on some of pad contact holes 810.

The embodiments illustrated with respect to FIG. 25 are substantially identical to the embodiments illustrated with respect to FIG. 24 except that an organic protective member 2510 is located on a second pad 2412; and, therefore, some redundant descriptions of similar elements may be omitted.

Referring to FIG. 25, an organic protective member 2510 having a height (e.g., a set or predetermined height) may be located on a second pad 2412. Because the second pad 2412 is covered by the organic protective member 2510, it may not be easy to fill it with the conductive ink 1211. According to some embodiments as illustrated with respect to FIG. 25 in which the organic protective member 2510 is located on the second pad 2412, it may be possible to electrically connect a pad electrode 922 of the second pad 2412 with the driving substrate 410 by using a conductive ink 1211 that penetrates a pad 1411 of the driving substrate 410 bonded to the rear contact hole 1010. In this instance, a protective resin 1221 covering the conductive ink 1211 connected to the first pad 2411 and a protective resin 1221 covering the conductive ink 1211 connected to the second pad 2412 may be connected with each other on the driving substrate 410.

The organic protective member 2510 shown in FIG. 25 may be the same member as at least one of the pixel definition layer 190 (see FIG. 5) included in the planarization layer FL and/or the emission material layer EML located between the thin-film transistor layer TFTL and the emission material layer EML. For example, the organic protective member 2510 may be a member located in the same layer as at least one of the first planarization film 160, the second planarization film 180, or the bank 190 described above with reference to FIG. 5.

Figure 26:
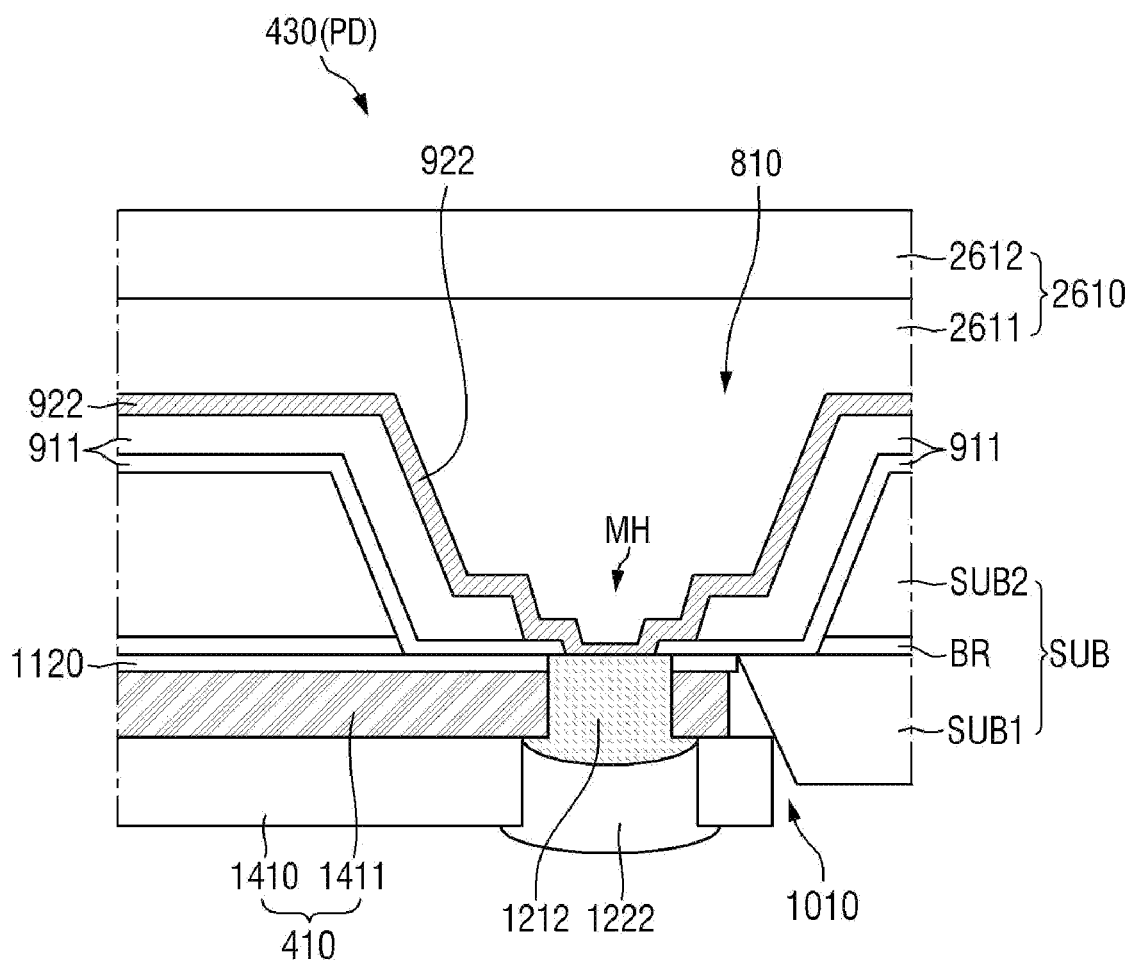
FIG. 26 is a cross-sectional view of a portion of a display panel according to some embodiments in which a planarization film is formed on some of pad contact holes.

FIG. 26 is a cross-sectional view of a portion of the display panel 10 according to some embodiments in which a planarization film is formed on some of the pad contact holes 810.

The embodiments illustrated with respect to FIG. 26 are substantially identical to the embodiments illustrated with respect to FIG. 17 except that a planarization film is located in place of the second inorganic film 1811 covering the pad electrode 922; and, therefore, the redundant descriptions will be omitted.

Referring to FIG. 26, each pad PD according to some embodiments may include a planarization film 2610 that covers a pad electrode 922 on the inner circumferential surface of a pad contact hole 810.

According to some embodiments, the planarization film 2610 may include a first planarization film 2611 located in the same layer as the planarization films 160 and 180 (see FIG. 5) located between the thin-film transistor layer TFTL and the emission material layer EML; and a second planarization film 2612 located in the same layer as the pixel definition film 190 (see FIG. 5) included in the emission material layer EML. The planarization film may be a protective film located in the same layer as at least one of the first planarization film 160, the second planarization film 180, or the bank 190 described above with reference to FIG. 5.

Figure 27:
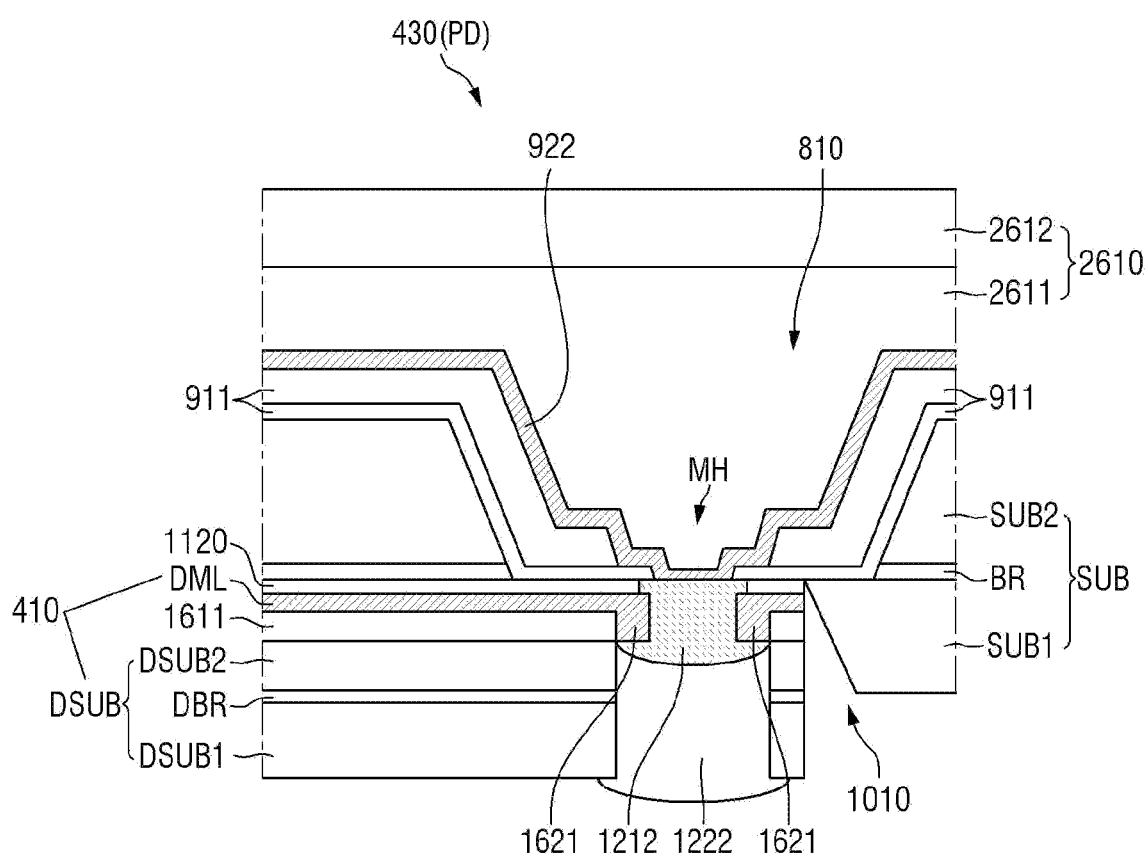
FIG. 27 is a cross-sectional view showing an example of a portion of a display panel in which the driving substrate shown in FIG. 26 is implemented as a flexible substrate.

FIG. 27 is a cross-sectional view showing an example of a portion of the display panel 10 in which the driving substrate 410 shown in FIG. 26 is implemented as a flexible substrate.

The embodiments illustrated with respect to FIG. 27 are substantially identical to the embodiments illustrated with respect to FIG. 26 except that the driving substrate 410 is a flexible substrate; and, therefore, some redundant descriptions of some components may be omitted.

Referring to FIG. 27, the driving substrate 410 according to some embodiments may include a substrate DSUB and a driver chip located on the substrate DSUB. The substrate DSUB of the driving substrate 410 may be a flexible substrate substantially the same as the substrate SUB of the display panel 10. For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. An inorganic film 1611 and a metal layer DML forming a lead line and a pad 1621 may be located on the second substrate DSUB2 of the driving substrate 410, and they may be made of the same materials as the first inorganic film 911 and the pad electrode 922 included in the display panel 10 via the same processes, respectively.

According to some embodiments, the pad 1621 of the driving substrate 410 may be an electrode extended from the lead line and may be bonded directly to the bottom of a rear contact hole 1010 by an adhesive 1120. The pad 1621 of the driving substrate 410 may have a bent shape at the pad hole, and may be arranged to cover a side surface of the inorganic film 1611 accordingly.

Figure 28:
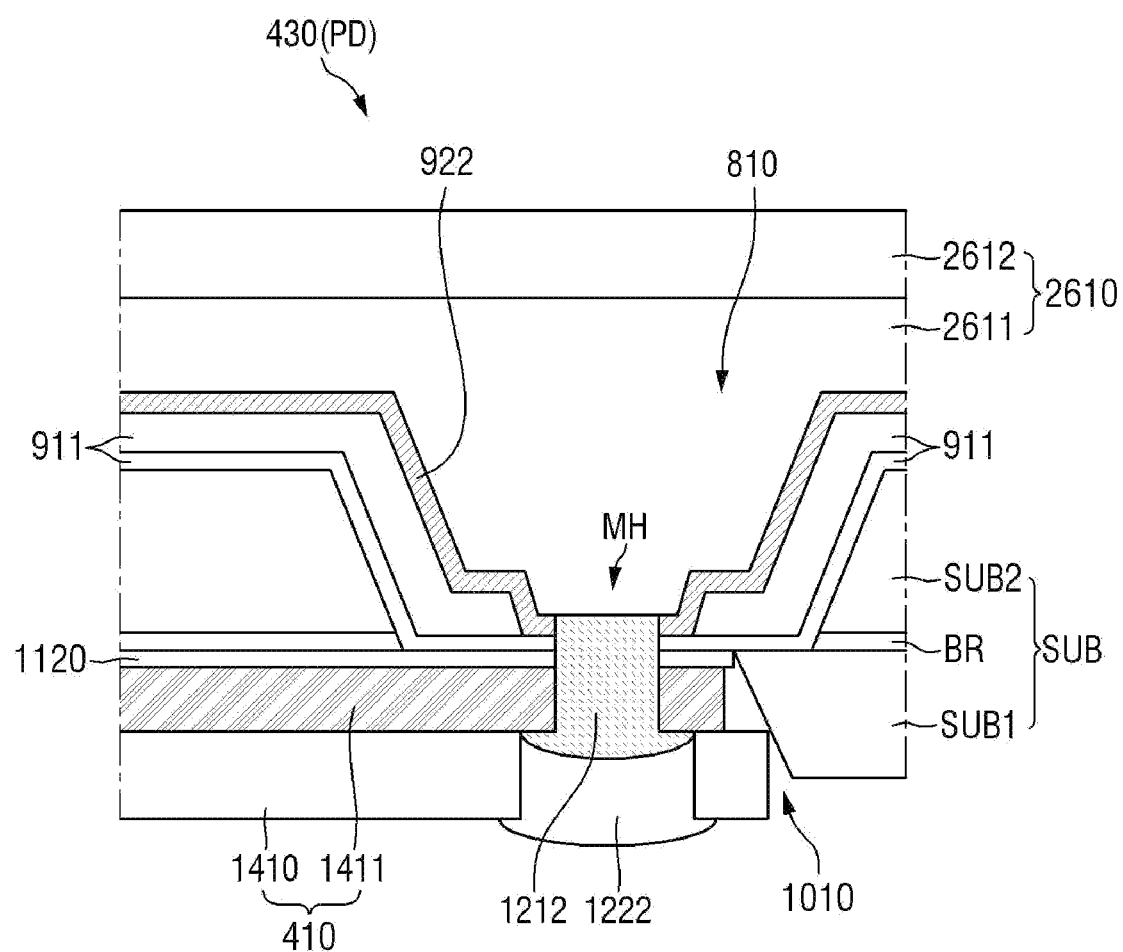
FIG. 28 is a cross-sectional view of a portion of a display panel according to some embodiments in which the shape of the pad electrode shown in FIG. 26 is modified.

FIG. 28 is a cross-sectional view of a portion of a display panel 10 according to some embodiments in which the shape of the pad electrode 922 shown in FIG. 26 is modified.

The embodiments illustrated with respect to FIG. 28 are substantially identical to the embodiments illustrated with respect to FIG. 26 except that a conductive ink 1211 is in direct contact with a side surface of a pad electrode 922; and, therefore, some redundant descriptions of some components may be omitted.

Referring to FIG. 28, in each pad PD according to some embodiments, the pad electrode 922 does not cover the middle hole MH so that the middle hole MH can be completely opened. The conductive ink 1211 that penetrates the pad 1411 of the driving substrate 410 in the thickness direction may cover the completely opened middle hole MH, and thus the conductive ink 1211 may be in direct contact with the side surface of the pad electrode 922.

Figure 29:
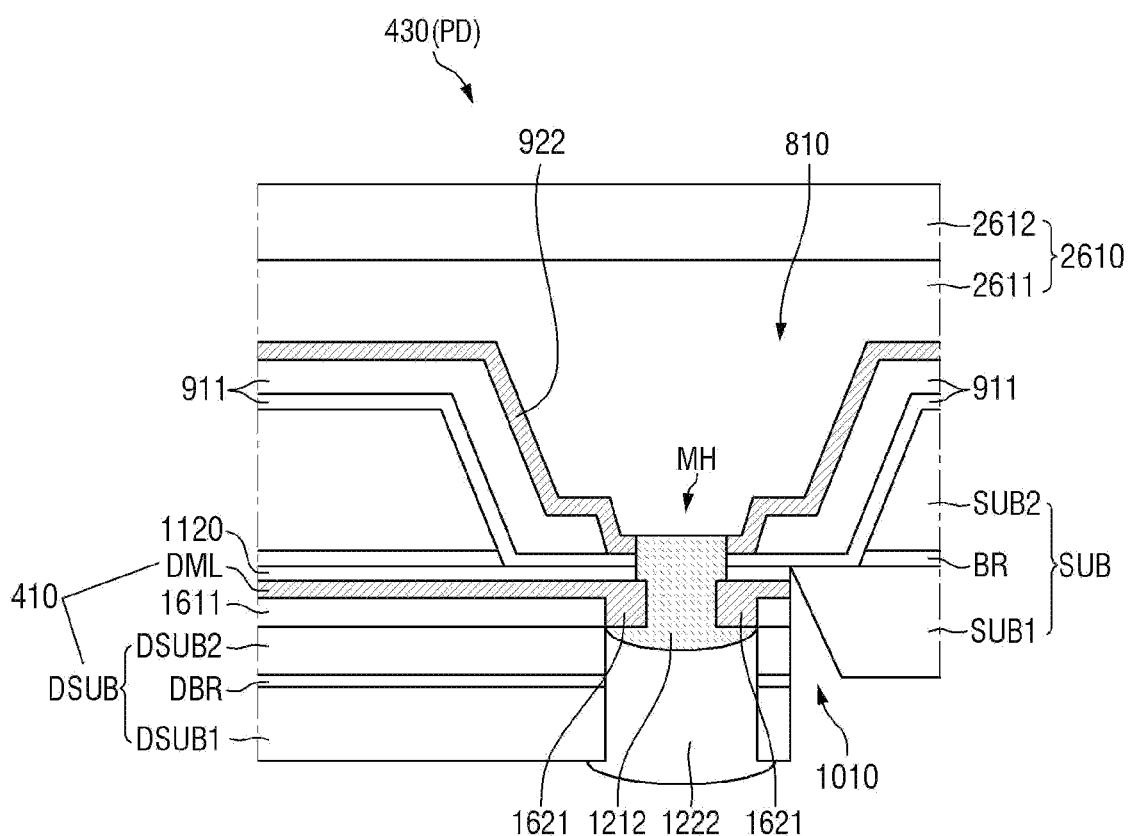
FIG. 29 is a cross-sectional view showing an example of a portion of a display panel in which the driving substrate shown in FIG. 28 is implemented as a flexible substrate.

FIG. 29 is a cross-sectional view showing an example of a portion of the display panel 10 in which the driving substrate 410 shown in FIG. 28 is implemented as a flexible substrate.

The embodiments illustrated with respect to FIG. 29 are substantially identical to the embodiments illustrated with respect to FIG. 28 except that the driving substrate 410 is a flexible substrate; and, therefore, some redundant descriptions of similar components may be omitted.

Figure 31:
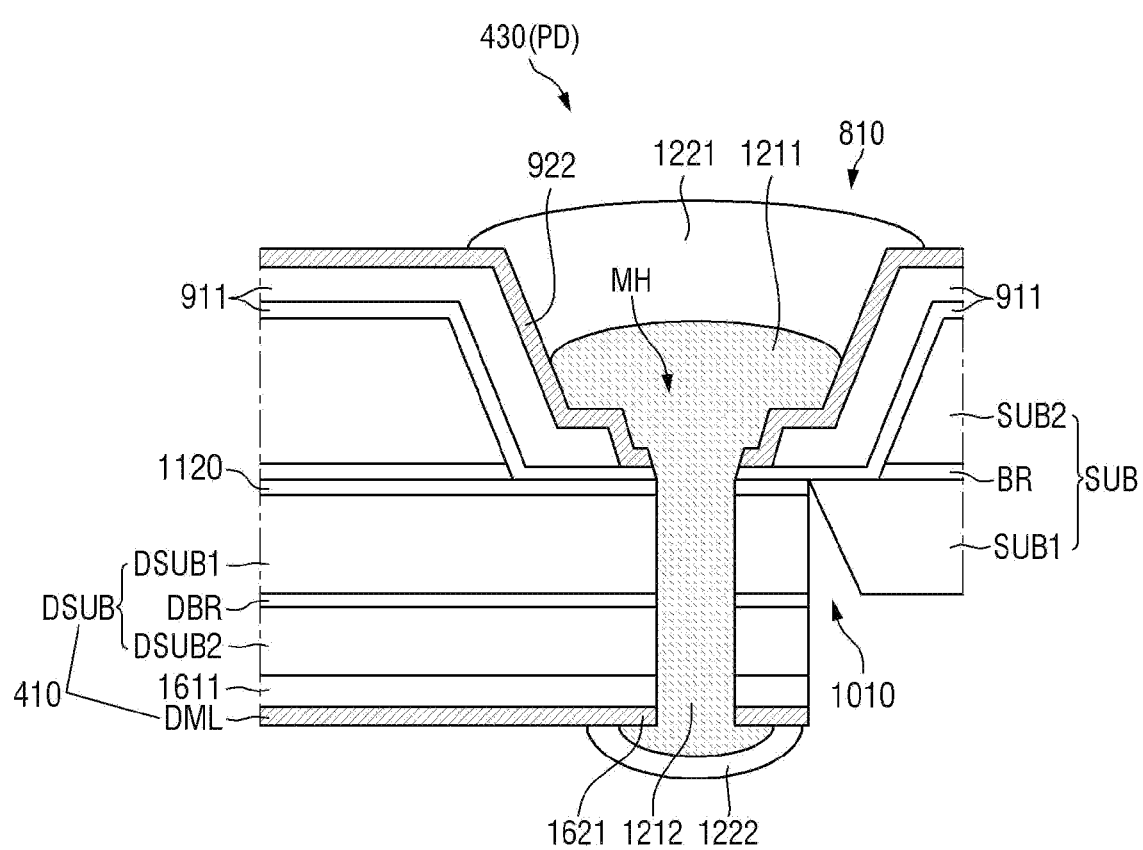
FIG. 31 is a cross-sectional view showing an example of a portion of a display panel in which the driving substrate shown in FIG. 30 is implemented as a flexible substrate.

Referring to FIG. 31, the driving substrate 410 according to some embodiments may include a substrate DSUB and a driver chip located on the substrate DSUB. The substrate DSUB of the driving substrate 410 may be a flexible substrate that is substantially the same as the substrate SUB of the display panel 10. For example, the driving substrate 410 and the substrate SUB of the display panel 10 may be substrates SUB and DSUB produced from a sing mother substrate, and may be divided into a driving substrate 410 and a substrate SUB of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. An inorganic film 1611 and a metal layer DML forming a lead line and a pad 1621 may be located on the second substrate DSUB2 of the driving substrate 410, and they may be made of the same materials as the first inorganic film 911 and the pad electrode 922 included in the display panel 10 via the same processes, respectively.

According to some embodiments, the pad 1621 of the driving substrate 410 may be an electrode extended from the lead line and may be bonded directly to the bottom of a rear contact hole 1010 by an adhesive 1120. The pad 1621 of the driving substrate 410 may have a bent shape at the pad hole, and may be arranged to cover a side surface of the inorganic film 1611 accordingly.

Figure 30:
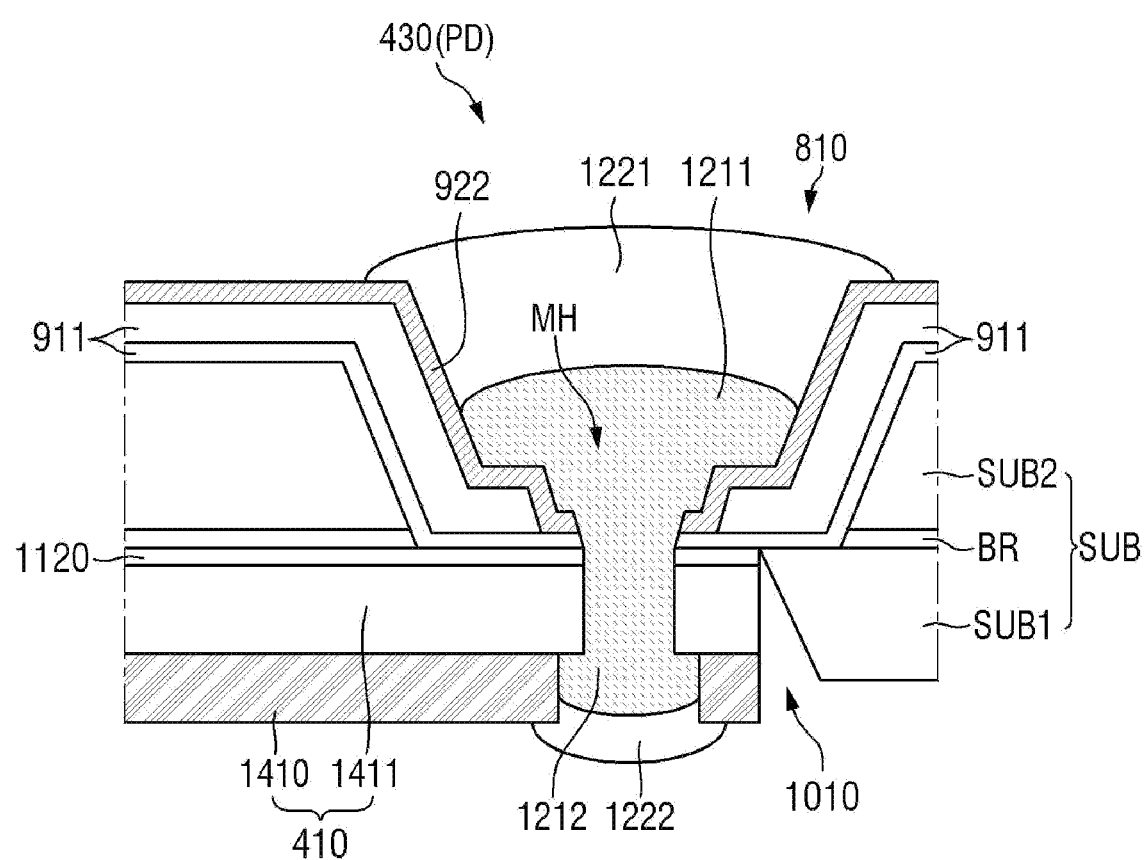
FIG. 30 is a cross-sectional view showing an example of a portion of the display panel in which a conductive ink includes an upper conductive ink and a lower conductive ink.

FIG. 30 is a cross-sectional view showing an example of a portion of the display panel 10 in which a conductive ink 1211 includes an upper conductive ink 1211 and a lower conductive ink 1212.

The embodiments illustrated with respect to FIG. 30 are substantially identical to the embodiments illustrated with respect to FIGS. 13 and 14 except that the conductive ink 1211 includes the upper conductive ink 1211 and the lower conductive ink 1212.

Referring to FIG. 30, in each pad PD according to some embodiments, the upper conductive ink 1211 covers a pad electrode 922 on the inner circumferential surface of a pad contact hole 810, and the lower conductive ink 1212 that penetrates a pad 1411 of the driving substrate 410 in the thickness direction is connected to the upper conductive ink 1211 through a middle hole MH.

According to some embodiments, the driving substrate 410 includes a substrate SUB) bonded to the bottom of a rear contact hole 1010, and the pad 1411 located under the substrate SUB. The driving substrate 410 includes the pad 1411 and a pad hole penetrating the substrate SUB in the thickness direction, and the pad hole is aligned with the middle hole MH. The pad hole is filled with lower conductive ink 1212, and the lower conductive ink 1212 is electrically connected to the upper conductive ink 1211 through the pad hole and the middle hole MH. Accordingly, the pad 1411 located under the driving substrate 410 is electrically connected to the pad electrode 922 of the display panel 10 through the lower conductive ink 1212 and the upper conductive ink 1211.

According to some embodiments, the driving substrate 410 may further include a protective resin 1221 covering the lower conductive ink 1212 of the substrate SUB.

FIG. 31 is a cross-sectional view showing an example of a portion of the display panel 10 in which the driving substrate 410 shown in FIG. 30 is implemented as a flexible substrate.

The embodiments illustrated with respect to FIG. 31 are substantially identical to the embodiments illustrated with respect to FIG. 30 except that a driving substrate 410 is a flexible substrate; and, therefore, some redundant descriptions of similar components may be omitted.

Referring to FIG. 31, the driving substrate 410 according to some embodiments may include a substrate DSUB and a driver chip located on the substrate DSUB. The substrate DSUB of the driving substrate 410 may be a flexible substrate that is substantially the same as the substrate SUB of the display panel 10. For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. An inorganic film 1611 and a metal layer DML forming a lead line and a pad 1621 may be located on the second substrate DSUB2 of the driving substrate 410, and they may be made of the same materials as the first inorganic film 911 and the pad electrode 922 included in the display panel 10 via the same processes, respectively.

According to some embodiments, the first substrate DSUB1 of the driving substrate 410 may be bonded directly to the bottom of a rear contact hole 1010, and a lead line and a pad 1621 of the driving substrate 410 may be located on the lower surface of the driving substrate 410. The upper surface of the driving substrate 410 may be the surface where the first substrate DSUB1 is located, and may refer to the surface bonded directly to the bottom of the rear contact hole 1010. The lower surface of the driving substrate 410 may refer to the opposite surface to the upper surface.

Figure 32:
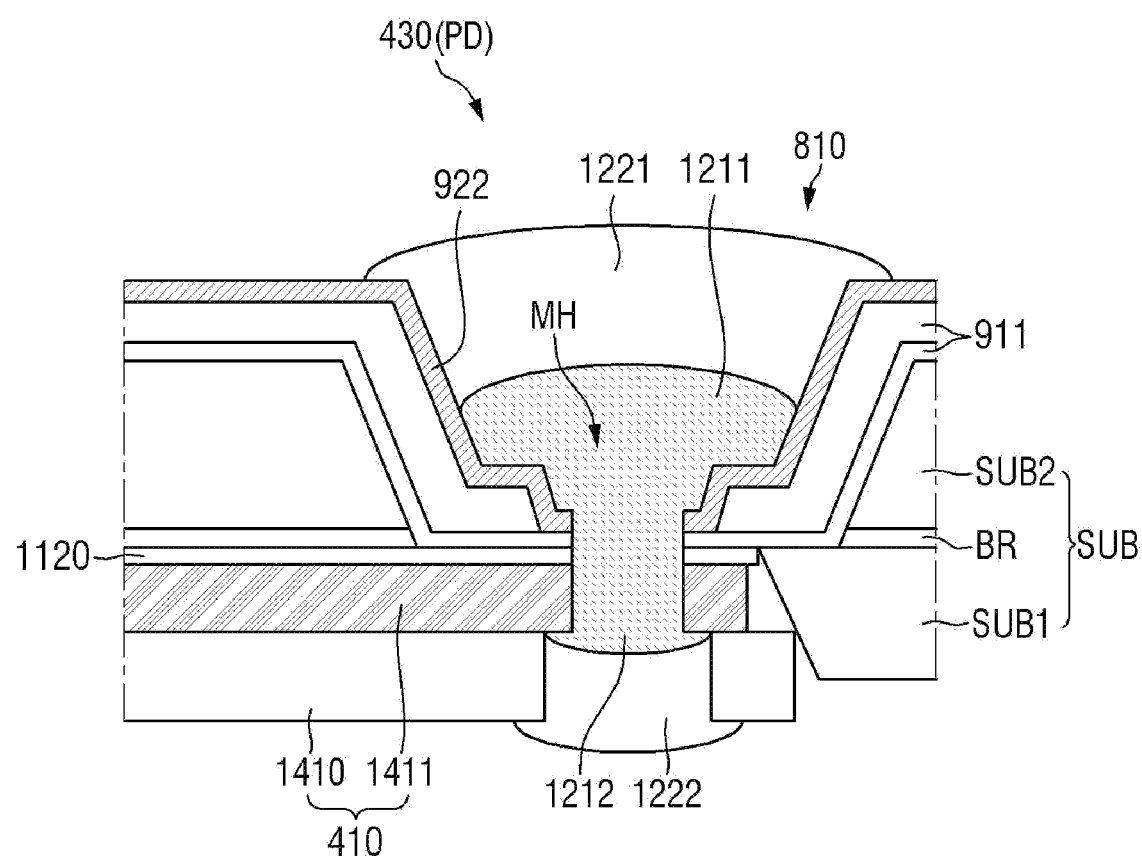
FIG. 32 is a cross-sectional view showing an example of a portion of a display panel in which a pad contact hole and a rear contact hole are filled with a conductive ink.

FIG. 32 is a cross-sectional view showing an example of a portion of the display panel 10 in which a pad contact hole 810 and a rear contact hole 1010 are filled with a conductive ink 1211.

The embodiments illustrated with respect to FIG. 32 are substantially identical to the embodiments illustrated with respect to FIG. 30 except that a pad of a driving substrate 410 is attached directly to the bottom of a rear contact hole 1010; and, therefore, some redundant descriptions of similar components may be omitted.

Referring to FIG. 32, a pad 1411 of the driving substrate 410 according to some embodiments is bonded directly to the bottom of the rear contact hole 1010, and the substrate SUB may be located on the lower surface of the driving substrate 410. The upper surface of the driving substrate 410 is the surface where the lead line and the pad 1411 are located, and may refer to the surface bonded directly to the bottom of the rear contact hole 1010. The lower surface of the driving substrate 410 may refer to the opposite surface to the upper surface.

Figure 33:
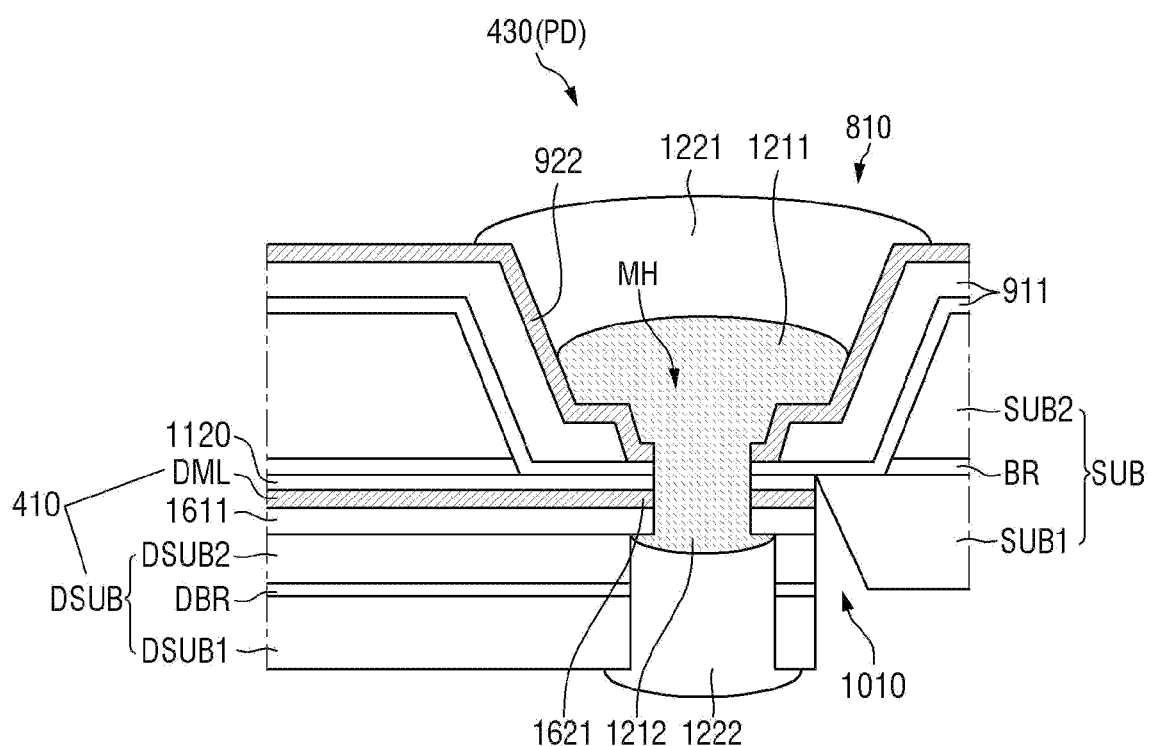
FIG. 33 is a cross-sectional view showing an example of a portion of a display panel in which the driving substrate shown in FIG. 32 is implemented as a flexible substrate.

FIG. 33 is a cross-sectional view showing an example of a portion of the display panel 10 in which the driving substrate 410 shown in FIG. 32 is implemented as a flexible substrate.

The embodiments illustrated with respect to FIG. 33 are substantially identical to the embodiments illustrated with respect to FIG. 31 except that a pad 1621 of the driving substrate 410 is attached directly to the bottom of a rear contact hole 1010; and, therefore, some redundant descriptions of similar components may be omitted Referring to FIG. 33, the pad 1621 of the driving substrate 410 according to some embodiments may be bonded directly to the bottom of the rear contact hole 1010, and the first substrate SUB1 may be located on the lower surface of the driving substrate 410. The upper surface of the driving substrate 410 may be the surface where a lead line and the pad 1621 are located, and may refer to the surface directly bonded to the bottom of the rear contact hole 1010. The lower surface of the driving substrate 410 may refer to the opposite surface to the upper surface.

Figure 34:
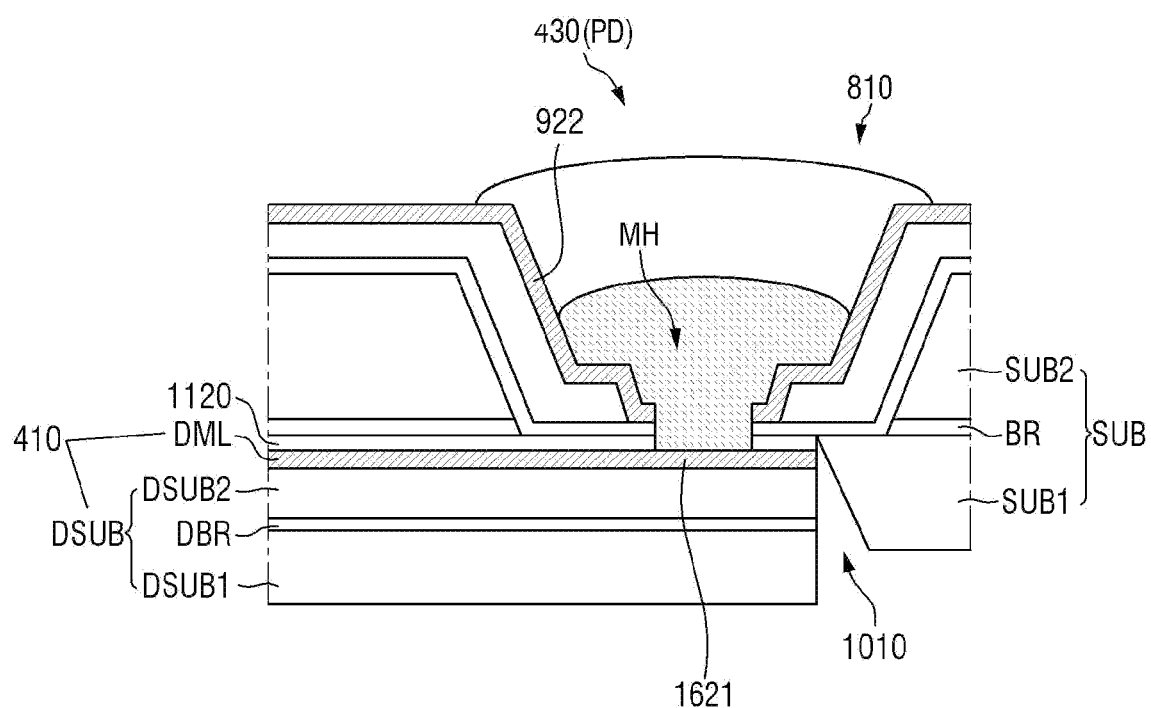
FIG. 34 is a cross-sectional view showing an example of a portion of a display panel in which the inorganic film included in the flexible substrate shown in FIG. 33 is removed.

FIG. 34 is a cross-sectional view showing an example of a portion of the display panel 10 in which the inorganic film 911 included in the flexible substrate shown in FIG. 33 is removed.

The embodiments illustrated with respect to FIG. 34 are substantially identical to the embodiments illustrated with respect to FIG. 33 except that the driving substrate 410 does not include the inorganic film 1611; and, therefore, some redundant descriptions of similar components may be omitted.

Referring to FIG. 34, the driving substrate 410 may not include an inorganic film (e.g., the inorganic film 1611 in FIG. 33). For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. A metal layer DML forming a lead line and a pad 1621 may be located on the second substrate DSUB2 of the driving substrate 410, and may be formed of the same material as the pad electrode 922 included in the display panel 10 via the same process.

Figure 35:
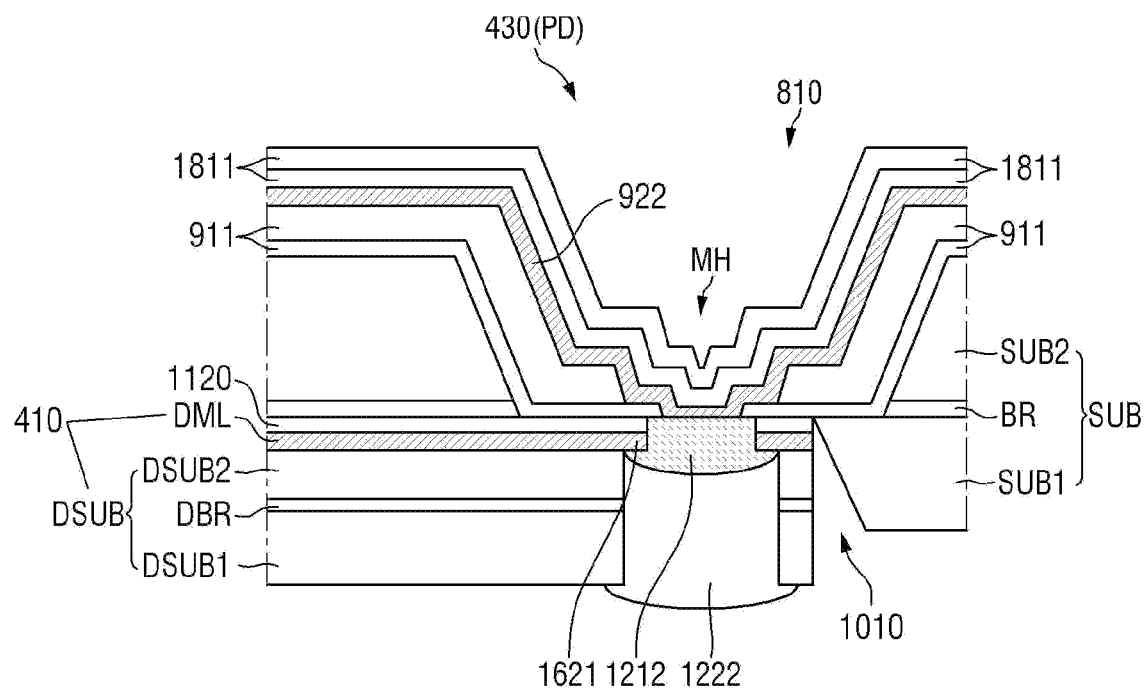
FIG. 35 is a cross-sectional view of a portion of a display panel according to some embodiments in which a pad electrode and a driving substrate are electrically connected with each other by a conductive ink filling a rear contact hole.

FIG. 35 is a cross-sectional view of a portion of a display panel 10 according to some embodiments in which a pad electrode 922 and a driving substrate 410 are electrically connected with each other by a conductive ink 1211 filling a rear contact hole 1010.

The embodiments illustrated with respect to FIG. 35 are substantially identical to the embodiments illustrated with respect to FIG. 20 except that the driving substrate 410 does not include the inorganic film 1611; and, therefore, some redundant descriptions of similar components may be omitted.

Referring to FIG. 35, the driving substrate 410 may not include an inorganic film (e.g., the inorganic film 1611 in FIG. 33). For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a first substrate DSUB1, a barrier film DBR, and a second substrate DSUB2 are sequentially stacked on one another. A metal layer DML forming a lead line and a pad 1621 may be located on the second substrate DSUB2 of the driving substrate 410, and may be formed of the same material as the pad electrode 922 included in the display panel 10 via the same process.

Incidentally, the pad 1621 of the driving substrate 410 shown in FIG. 35 may have a bent shape at the pad hole, like the pad 1621 in FIG. 20, and may be located to cover a side surface of the inorganic film 1611.

Figure 36:
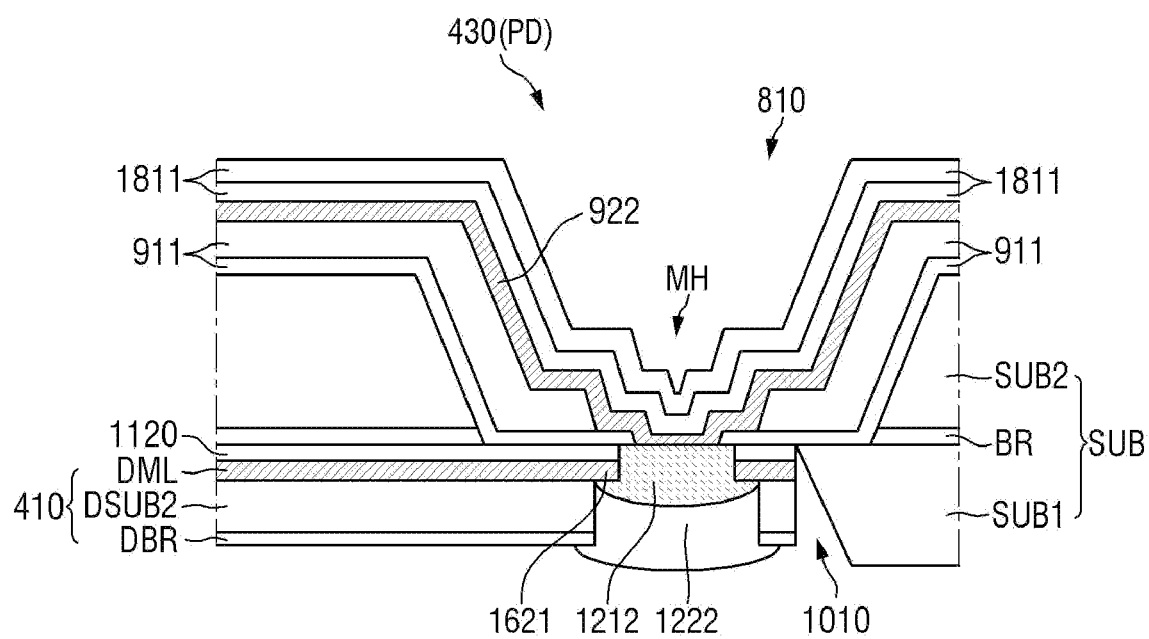
FIG. 36 is a cross-sectional view of an example of a portion of a display panel in which a flexible substrate of a driving substrate includes a single polymer layer.

FIG. 36 is a cross-sectional view of a portion of the display panel 10 illustrating an example in which a flexible substrate of a driving substrate 410 includes a single polymer layer.

The embodiments illustrated with respect to FIG. 36 are substantially identical to the embodiments illustrated with respect to FIG. 35 except that the driving substrate 410 does not include the first substrate SUB1 (e.g., the substrate SUB1 of FIG. 33); and, therefore, some redundant descriptions of similar components may be omitted.

Referring to FIG. 36, the driving substrate 410 according to some embodiments may not include a first substrate (e.g., the first substrate SUB1 in FIG. 33) but may include a second substrate SUB2 as a single polymer layer. For example, the driving substrate 410 and the substrate SUB of the display panel 10 may be substrates SUB and DSUB produced from a sing mother substrate, and may be divided into a driving substrate 410 and a substrate (SUB) of the display panel 10 via a process of cutting the mother substrate. Accordingly, the stacked structure of the driving substrate 410 may be identical to at least part of the stacked structure of the display panel 10.

According to some embodiments, the substrate DSUB of the driving substrate 410 may be a substrate DSUB in which a barrier film DBR and a second substrate DSUB2 are sequentially stacked on each other with a first substrate DSUB1 removed therefrom during the fabricating processes. For example, the first substrate DSUB1 included in the driving substrate 410 may be removed in the process of forming the rear contact hole 1010 of the display panel 10 in the mother substrate.

Figure 37:
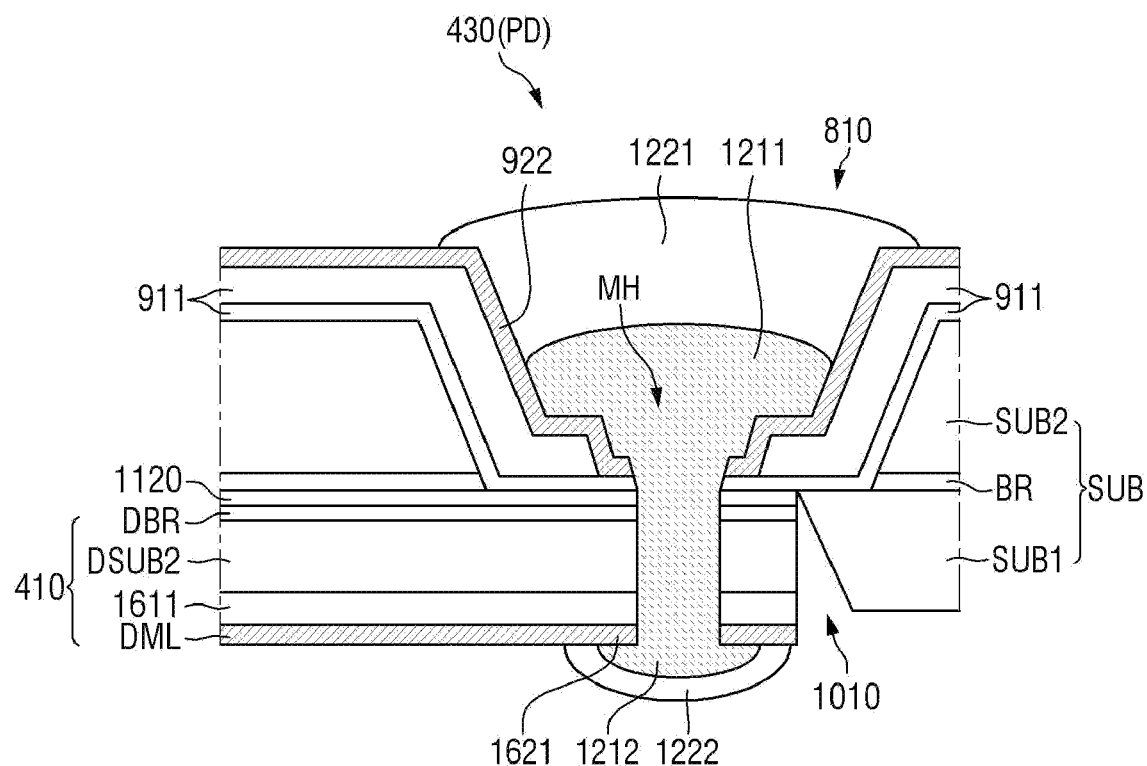
FIG. 37 is a cross-sectional view showing an example of a portion of a display panel in which a pad contact hole and a rear contact hole are filled with a conductive ink.

FIG. 37 is a cross-sectional view of a portion of the display panel 10 illustrating an example in which a flexible substrate of a driving substrate 410 includes a single polymer layer.

The embodiments illustrated with respect to FIG. 37 are substantially identical to the embodiments illustrated with respect to FIG. 31 except that the driving substrate 410 does not include the first substrate (e.g., the substrate DSUB1 of FIG. 33); and, therefore, some redundant descriptions of similar components may be omitted.

Referring to FIG. 37, the driving substrate 410 according to some embodiments may not include a first substrate (e.g., the first substrate DSUB1 in FIG. 33) but may include a second substrate SUB2 as a single polymer layer. For example, the driving substrate 410 and the substrate SUB of the display panel 10 may be substrates SUB and DSUB produced from a single mother substrate, and may be divided into the driving substrate 410 and the substrate SUB of the display panel 10 via a process of cutting the mother substrate. Accordingly, the stacked structure of the driving substrate 410 may be identical to at least part of the stacked structure of the display panel 10.

In concluding the detailed description, those skilled in the art will appreciate that many variations and modifications can be made to the disclosed embodiments without substantially departing from the principles of the present invention. Therefore, the disclosed embodiments of the invention are used in a generic and descriptive sense only and not for purposes of limitation.

What is claimed is:

1. A display device comprising:
a substrate comprising a first substrate, a barrier film and a second substrate sequentially stacked on one another;
a thin-film transistor layer, an emission material layer, an encapsulation layer and a touch detecting unit sequentially stacked on the second substrate; and
a pad area in a non-display area of the substrate and comprising a plurality of pads connected to a driving substrate and facing the first substrate,
wherein each of the plurality of pads comprises:
a pad contact hole formed by etching the second substrate and the barrier film;
a first inorganic film and a pad electrode sequentially stacked on an inner circumferential surface of the pad contact hole; and
a rear contact hole formed by etching a portion of the first substrate in line with the pad contact hole, a pad of the driving substrate being bonded to a bottom of the rear contact hole,
wherein the first inorganic film forms a middle hole connecting the pad contact hole with the rear contact hole, and the pad electrode covers at least a part of the middle hole, and
wherein the pad of the driving substrate is electrically connected to the pad electrode covering the middle hole through a lower conductive ink.

2. The display device of claim 1, wherein the driving substrate comprises:
a pad bonded to the bottom of the rear contact hole;
a pad hole penetrating a portion of the pad aligned with the middle hole in a thickness direction;
the lower conductive ink covering the inner circumferential surface of the pad hole; and
a protective resin covering the lower conductive ink.

3. The display device of claim 2, further comprising:
an upper conductive ink covering the pad electrode on the inner circumferential surface of the pad contact hole; and
a protective resin covering the upper conductive ink,
wherein the upper conductive ink and the lower conductive ink are connected with each other through the middle hole.

4. The display device of claim 1, wherein the driving substrate comprises a flexible printed circuit board (FPCB) and a driver chip on the FPCB as a chip on film (COF).

5. The display device of claim 1, wherein the driving substrate comprises a flexible substrate and a driver chip on the flexible substrate as a chip on plastic (COP).

6. The display device of claim 1, wherein the first inorganic film is in a same layer as an inorganic film included in the thin-film transistor layer.

7. The display device of claim 1, wherein the pad electrode is in a same layer as a source electrode or a drain electrode of a thin-film transistor in the thin-film transistor layer.

8. The display device of claim 1, wherein the pad electrode is at least one of: a signal pad extended from signal lines for driving pixels in a display area, a power pad extended from power lines, an electrostatic pad electrically connected to electrostatic lines, or a touch driving pad electrically connected to a touch line of the touch detecting unit.

9. The display device of claim 1, further comprising:
a second inorganic film covering the pad electrode on the inner circumferential surface of the pad contact hole, wherein the second inorganic film is on a same layer as an inorganic film in the encapsulation layer.

10. The display device of claim 1, further comprising:
a planarization film covering the pad electrode on the inner circumferential surface of the pad contact hole,
wherein the planarization film is on a same layer as at least one of a planarization film between the thin-film transistor layer and the emission material layer, or a pixel-defining layer in the emission material layer.

11. A display device comprising:
a substrate comprising a first substrate, a barrier film, and a second substrate sequentially stacked on one another;
a thin-film transistor layer, an emission material layer, an encapsulation layer and a touch detecting unit sequentially stacked on the second substrate; and
a pad area in a non-display area of the substrate and comprising a plurality of pads connected to a driving substrate and facing the first substrate,
wherein each of the plurality of pads comprises:
a pad contact hole formed by etching the second substrate and the barrier film;
a first inorganic film and a pad electrode sequentially stacked on an inner circumferential surface of the pad contact hole; and
a rear contact hole formed by etching a portion of the first substrate in line with the pad contact hole, a pad of the driving substrate being bonded to a bottom of the rear contact hole,
wherein the first inorganic film forms a middle hole connecting the pad contact hole with the rear contact hole, and
wherein the pad of the driving substrate is electrically connected to the pad electrode through the middle hole and an upper conductive ink covering the pad electrode.

12. The display device of claim 11, wherein the driving substrate comprises a flexible printed circuit board (FPCB) and a driver chip on the FPCB as chip on film (COF).

13. The display device of claim 11, wherein the driving substrate comprises a flexible substrate and a driver chip on the flexible substrate as chip on plastic (COP).

14. The display device of claim 11, wherein the first inorganic film is in a same layer as an inorganic film included in the thin-film transistor layer.

15. The display device of claim 11, wherein the pad electrode is in a same layer as a source electrode or a drain electrode of a thin-film transistor in the thin-film transistor layer.

16. The display device of claim 11, wherein the pad electrode is at least one of: a signal pad extended from signal lines for driving pixels in a display area, a power pad extended from power lines, an electrostatic pad electrically connected to electrostatic lines, or a touch driving pad electrically connected to a touch line of the touch detecting unit.

17. The display device of claim 11, wherein the pad of the driving substrate comprises a groove aligned with the middle hole.

18. The display device of claim 17, wherein the groove of the pad is filled with a part of the upper conductive ink.

19. The display device of claim 11, wherein the driving substrate comprises:
a substrate;
a pad on the substrate and bonded to a bottom of the rear contact hole;
a pad hole penetrating portions of the pad and the substrate in line with the middle hole in a thickness direction;
a lower conductive ink covering an inner circumferential surface of the pad hole; and
a protective resin covering the lower conductive ink,
wherein the lower conductive ink is connected to the upper conductive ink through the pad hole and the middle hole.

20. The display device of claim 11, wherein the driving substrate comprises:
a substrate bonded to a bottom of the rear contact hole;
a pad under the substrate;
a pad hole penetrating portions of the pad and the substrate in line with the middle hole in a thickness direction;
a lower conductive ink covering an inner circumferential surface of the pad hole; and
a protective resin covering the lower conductive ink,
wherein the lower conductive ink is connected to the upper conductive ink through the pad hole and the middle hole.

* * * * *